(12) United States Patent
Satoyama et al.

(10) Patent No.: US 11,112,971 B2
(45) Date of Patent: Sep. 7, 2021

(54) STORAGE DEVICE, DATA MANAGEMENT METHOD, AND DATA MANAGEMENT PROGRAM

(71) Applicant: HITACHI, LTD., Tokyo (JP)

(72) Inventors: Ai Satoyama, Tokyo (JP); Tomohiro Kawaguchi, Tokyo (JP); Yoshihiro Yoshii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/103,577

(22) Filed: Aug. 14, 2018

(65) Prior Publication Data

US 2019/0121549 A1 Apr. 25, 2019

(30) Foreign Application Priority Data

Oct. 20, 2017 (JP) .............................. JP2017-203499

(51) Int. Cl.
*G06F 12/00* (2006.01)
*G06F 3/06* (2006.01)

(52) U.S. Cl.
CPC ............ *G06F 3/0608* (2013.01); *G06F 3/064* (2013.01); *G06F 3/0658* (2013.01); *G06F 3/0661* (2013.01); *G06F 3/0665* (2013.01); *G06F 3/0688* (2013.01); *G06F 3/0659* (2013.01)

(58) Field of Classification Search
None
See application file for complete search history.

(56) References Cited

U.S. PATENT DOCUMENTS

2012/0272123 A1* 10/2012 Yeh .................... G06F 12/0246
714/773
2016/0371190 A1* 12/2016 Romanovskiy ......... G06F 3/067
2018/0024752 A1* 1/2018 Miller ................. G06F 13/4282
711/154

FOREIGN PATENT DOCUMENTS

JP 2009-104236 A 10/2007

* cited by examiner

*Primary Examiner* — Jason W Blust
(74) *Attorney, Agent, or Firm* — Volpe Koenig

(57) ABSTRACT

A storage device includes one or more FMPKs including a FM chip capable of storing data and a storage controller that controls storing of write data of a predetermined write request for the FMPK. The FMPK includes a compression/decompression circuit that compresses data according to a second compression algorithm different from a first compression algorithm. The storage controller compresses data using the first compression algorithm, and determines whether the write data will be compressed using the storage controller or the compression/decompression circuit based on a predetermined condition. The write data is compressed by the determined storage controller or compression/decompression circuit and is stored in the FMPK.

13 Claims, 14 Drawing Sheets

FIG. 10

COMPRESSION ALGORITHM INFORMATION  2400

| ALGORITHM NUMBER | ALGORITHM NAME | APPLICATION CONDITION |
|---|---|---|
| ALGORITHM 1 | Zstd | ACCESS FREQUENCY IS LOW |
| ALGORITHM 2 | Lz4 | ACCESS FREQUENCY IS HIGH |

FMPK INFORMATION  2700

| FMPKID | | |
|---|---|---|
| FMPK GROUP ID | | |
| BLOCK NUMBER OF FMPK ADDRESS SPACE | BLOCK NUMBER OF FLASH MEMORY ADDRESS SPACE | SIZE AFTER COMPRESSION |

2710
2720

2730  2740  2750

STORAGE DEVICE, DATA MANAGEMENT METHOD, AND DATA MANAGEMENT PROGRAM

BACKGROUND OF THE INVENTION

1. Field of the Invention

The present invention relates to a storage device and the like for compressing and managing data.

2. Description of Related Art

Although the price of a flash storage device such as an all flash array (AFA) is determined by a media cost of a flash memory, a bit cost of the flash memory is still expensive. In an all flash array, the bit cost is reduced by reducing a physical volume of a flash memory using various techniques including compression.

Various compression algorithms are employed in a storage device, and the respective compression algorithms have different characteristics in compression/decompression speed, compression ratio, and memory amount required for compression and decompression and the like.

In the related art, any one compression algorithm is selected and employed as a compression function of a storage device.

A technique disclosed in JP-A-2009-104236, for example, is known as a technique of storing compressed data of a storage device.

Although a flash storage device having a compression function implemented therein is known, a data storage method based on a write-once-type log structured system is employed in a flash storage device. According to the data storage method based on the log structured system, an overwrite process in a flash storage device writes (overwrites) overwrite data to a storage area newly secured by a storage controller for the overwrite data rather than a storage area (a storage area managed by a storage controller of a storage device) in which old data (data before update) is written. The storage area in which old data is stored is an invalid area (that is, a garbage) in which new data cannot be written. In a flash storage device, when a certain amount of garbage is accumulated, a garbage collection (GC) process is executed by a storage controller and garbage is used as a vacant area in which new data can be written.

When a certain compression algorithm is employed in a storage device, an implementable compression ratio, a load of compression and decompression processes, and the like are determined by the characteristics of the employed compression algorithm. Depending on the property (for example, high access frequency or a low access frequency) of data to be stored in the storage device, although one may want to improve a volume efficiency of the storage device and may want to reduce the load of compression and decompression processes, the volume efficiency and the load may be limited by the employed compression algorithm.

SUMMARY OF THE INVENTION

With the foregoing in view, an object of the present invention is to provide a technique of compressing and managing data appropriately.

In order to achieve the object, a storage device according to a first aspect is a storage device including one or more nonvolatile memory packages including a nonvolatile recording medium capable of storing data, and a storage controller that controls storing of write data of a predetermined write request for the nonvolatile memory packages. The storage device includes: a first data compression unit that compresses data according to a first compression algorithm; and a second data compression unit that compresses data according to a second compression algorithm different from the first compression algorithm. The storage controller determines, based on a predetermined condition, whether the write data will be compressed by the first data compression unit or the second data compression unit, compresses the write data using the determined first data compression unit or second data compression unit, and stores the compressed write data in the nonvolatile memory package.

According to the present invention, it is possible to compress and manage data appropriately.

BRIEF DESCRIPTION OF THE DRAWINGS

FIG. 10 is a schematic diagram of compression algorithm information according to the first embodiment;

FIG. 11 is a schematic diagram of FMPK information according to the first embodiment;

DESCRIPTION OF EMBODIMENTS

Figure 1:
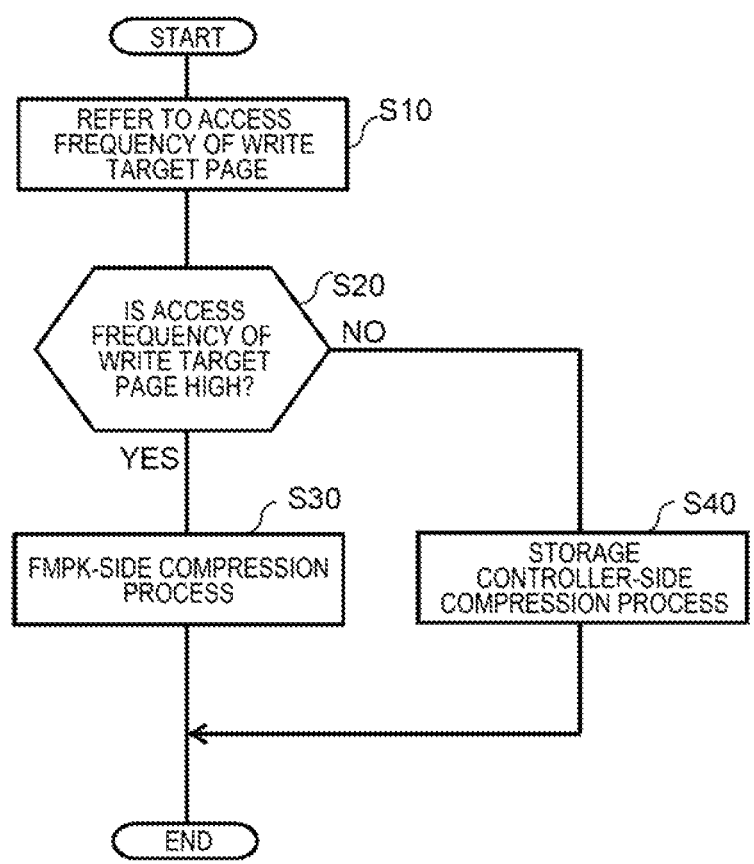
FIG. 1 is a flowchart illustrating an overview of a data management method according to a first embodiment.

Embodiments will be described with reference to the drawings. The embodiments described below do not limit the inventions related to the claims and various elements described in the embodiments and all combinations thereof are not necessarily indispensable to solutions to problems of the inventions.

In the following description, information related to embodiments is expressed using a table-based data structure, for example. However, such information need not necessarily be expressed by a table-based data structure. For example, such information may be expressed using a data structure such as "list", "database (DB)", or "queue" or the like. Due to this, "table," "list," "DB," "queue," and the like may also be referred to simply as "information" to show that such information does not depend on a data structure. In addition, expressions such as "identification information," "identifier," "name," "ID", and "number" may also be used to describe the content of each information, and such representations are interchangeable.

In the following description, "program" is used as a subject of an operation. However, a processor or a controller may be used as a subject since a program performs a specified process using a memory and a communication port (a communication control device) by being executed by a processor.

A process that is disclosed using a program as a subject may also be a process that is performed by a computer (a computer or an information processing device) such as a storage device. Part or all of programs may be realized by dedicated hardware, or may be realized as a module. A variety of programs may be installed on each computer by a program distribution server or a storage medium (for example, a nonvolatile recording medium).

A read/write process is sometimes referred to as a readout/write process or an update process. These processes may be collectively referred to as an access request access process.

"Compression" refers to a process of reducing a data size while maintaining the meaning of the data using a lossless compression algorithm such as an LZW algorithm, for example. In a computer system according to an embodiment, data written from a host may be compressed in a storage device. Data having its size reduced by being compressed by the storage device is referred to as "compressed data", and data that is not compressed by the storage device is referred to as "uncompressed data". A process of restoring the size of compressed data to an original data size using a lossless compression algorithm is referred to as "decompression".

In the following description, "compression rate" used as an index of the reduction efficiency of data size by data compression. The compression rate in the present specification is defined by the following calculation formula.

Compression rate=(Compressed data size)/(Uncompressed data size)

""Update"" refers to rewriting (overwriting) the content of data stored in a storage area to a new content. The data stored in a certain storage area before the storage area is updated is referred to as "data before update". On the other hand, the data newly written to the storage area is referred to as "updated data" or "data after update".

In the following description, "RAID" is an abbreviation of redundant array of independent (or inexpensive) disks. A RAID group is made up of a plurality of physical devices (typically physical devices of the same type) and stores data according to a RAID level associated with the RAID group. The RAID group may be referred to as a parity group. A parity group may be a RAID group that stores parity, for example.

First, an overview of a data management method according to a first embodiment will be described.

FIG. 1 is a flowchart illustrating an overview of a data management method according to a first embodiment.

A storage device 104 (see FIG. 2) receives an overwrite request from a user with respect to a volume stored in the storage device 104 from a high-order computer (for example, a host computer 101). Upon receiving the overwrite request, the storage device 104 refers to access frequency information which is the frequency of an I/O request for a page (a write target page) serving as a write destination of target data (write data) of the overwrite request (S10). Here, the overwrite request is a write request for writing write data to a location of a volume in which write data is already stored.

Subsequently, the storage device 104 determines whether the access frequency of the write target page is higher than a predetermined threshold (S20).

As a result, when the access frequency is higher than the threshold (S20: YES), the storage device 104 determines that the write target page is a page having a high access frequency and offloads a write data compression process to a flash memory package (FMPK) 113 (see FIG. 2) (S30). On the other hand, when the access frequency of the write target page is low (S20: NO), the storage device 104 performs a write data compression process on a storage controller 109 side (the storage controller 109 or a circuit or the like connected to the storage controller 109 via a bus) (S40). In the present embodiment, the compression process executed by the FMPK 113 and the compression process executed on the storage controller 109 side are different compression algorithms. The compression algorithm with which the compression process is executed is selected based on the access frequency of the write target page, and the write data is compressed by the compression algorithm. After that, the write data is stored in an FM chip 280 (see FIG. 3) of the FMPK 113.

Next, a computer system according to the first embodiment will be described in detail.

Figure 2:
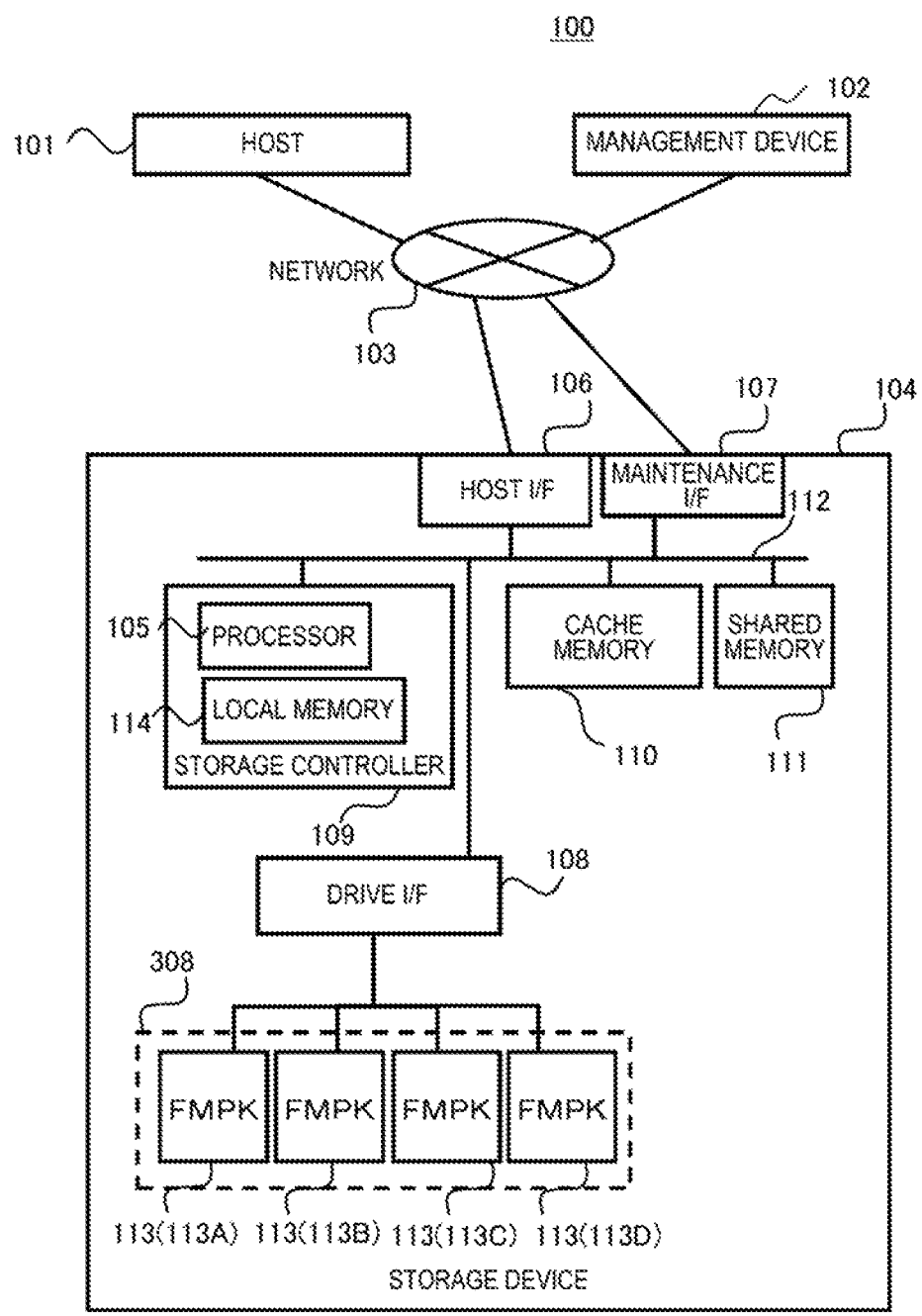
FIG. 2 is a whole schematic diagram of a computer system according to the first embodiment.

FIG. 2 is a schematic diagram of the computer system according to the first embodiment.

The computer system 100 includes one or more host computers (referred to as hosts) 101, one or more management devices 102, and the storage device 104. The host 101, the management device 102, and the storage device 104 are connected via a network 103. The network 103 may be a local area network (LAN) or a wide area network (WAN), for example. Moreover, a network connecting the host 101 and the storage device 104 may be different from a network connecting the management device 102 and the storage device 104. Furthermore, the computer system 100 may not include the management device 102.

The host 101 may be constituted, for example, by a general-purpose large-scale computer or server, a device including general-purpose hardware components, a general-purpose server, and the like and is a computer that executes application programs. The host 101 accesses a logical storage area (a virtual volume) provided by the storage device 104 via the network 103. The host 101 accesses data stored in a virtual volume of the storage device 104 by issuing a read command (a read request) or a write command (a write request) which is an access command to the storage device 104.

The management device 102 may be constituted, for example, by a management computer or server, a device including general-purpose hardware components, a general-purpose server, and the like and manages a configuration of a storage area of the storage device 104.

The storage device 104 stores data in a storage area of the FMPK 113. The storage device 104 provides one or more volumes (virtual volumes or logical volumes) to the host 101.

The storage device 104 includes a host interface (I/F) 106, a maintenance I/F 107, a storage controller 109, a cache memory 110, a shared memory 111, a drive interface (I/F) 108, and FMPKs 113 (113A to 113D) as an example of a nonvolatile memory package. These hardware components may be redundant. These components are connected to each other by a bus 112. The FMPK 113 may be removed from the storage device 104, and the storage device 104 without the FMPK 113 may be connected to the FMPK 113 via an external network (not illustrated).

The host I/F 106 is an interface device used for the storage device 104 to communicate with an initiator such as the host 101. The host I/F 106 transmits and receives data to and from the host 101 via the network 103. A command that the host 101 issues to access a volume arrives in the host I/F 106. Moreover, the storage device 104 returns information (response) from the host I/F 106 to the host 101.

The maintenance I/F 107 is an interface device for the storage device 104 to communicate with the management device 102. The maintenance I/F 107 transmits and receives data (management information) necessary for system management to and from the host 101 or the management device 102 via the network 103. A command from the management device 102 arrives in the maintenance I/F 107. Moreover, the storage device 104 returns information (response) from the maintenance I/F 107 to the management device 102.

The storage controller 109 includes a processor 105 and a local memory 114 connected to the processor 105. The local memory 114 is constituted by a RAM or the like, for example, and stores programs, data, and the like used in the processor 105. The processor 105 reads programs stored in the shared memory 111 into the local memory 114 and executes processes described in the programs. The programs executed by the processor 105 include a compression/decompression program for executing a data compression process and a data decompression process (compression/decompression process) according to a predetermined compression algorithm, for example. In the present embodiment, the processor 105 executes a data compression/decompression process by executing the compression/decompression program. However, the present invention is not limited thereto, and a hardware circuit executing the compression/decompression process may be connected to the storage controller 109 or the bus 112 so that the compression/decompression process is executed by the circuit.

The shared memory 111 is constituted by a nonvolatile memory such as a hard disk or a flash memory, for example, and stores programs, configuration information, and the like executed by the processor 105. The shared memory 111 may be constituted by a nonvolatile memory or a volatile memory such as DRAM or SRAM.

The cache memory 110 is constituted by a nonvolatile memory or a volatile memory such as DRAM or SRAM, for example, and temporarily stores write data for a virtual volume (the FMPK 113) or data (read data) read from the virtual volume (the FMPK 113).

The cache memory 110 and the shared memory 111 can access from the processor 105 of an arbitrary controller 109 unlike the local memory 114 in the controller 109.

The drive I/F 108 transmits and receives data to and from the FMPK 113. A network I/F different from the maintenance I/F 107 may be provided in the storage device 104 so that an external storage device is connected to the storage device 104 via the network I/F and a network. In this case, a storage area provided from an external storage device may be at least a portion of the storage areas of a pool to be described later, managed by the storage device 104.

The FMPK 113 is a storage device including a nonvolatile storage medium for finally storing the write data from the host 101. The storage controller 109 may have a RAID function capable of restoring data of the FMPK 113 even when one FMPK 113 breaks down. In this case, a plurality of FMPKs 113 forms one RAID group (a parity group) 308.

The FMPK 113 has one or more flash memory chips 280 (see FIG. 3), for example, as a nonvolatile recording medium. An example of the FMPK 113 is a solid state drive (SSD).

The FMPK 113 may have a function (a compression function) of compressing write data and storing the same in its storage medium. A plurality of FMPKs 113 provides one or more logical storage areas (logical volumes) based on a RAID group. The logical volume is correlated with a physical storage area included in the FMPK 113 of the RAID group.

Next, the FMPK 113 will be described in detail.

Figure 3:
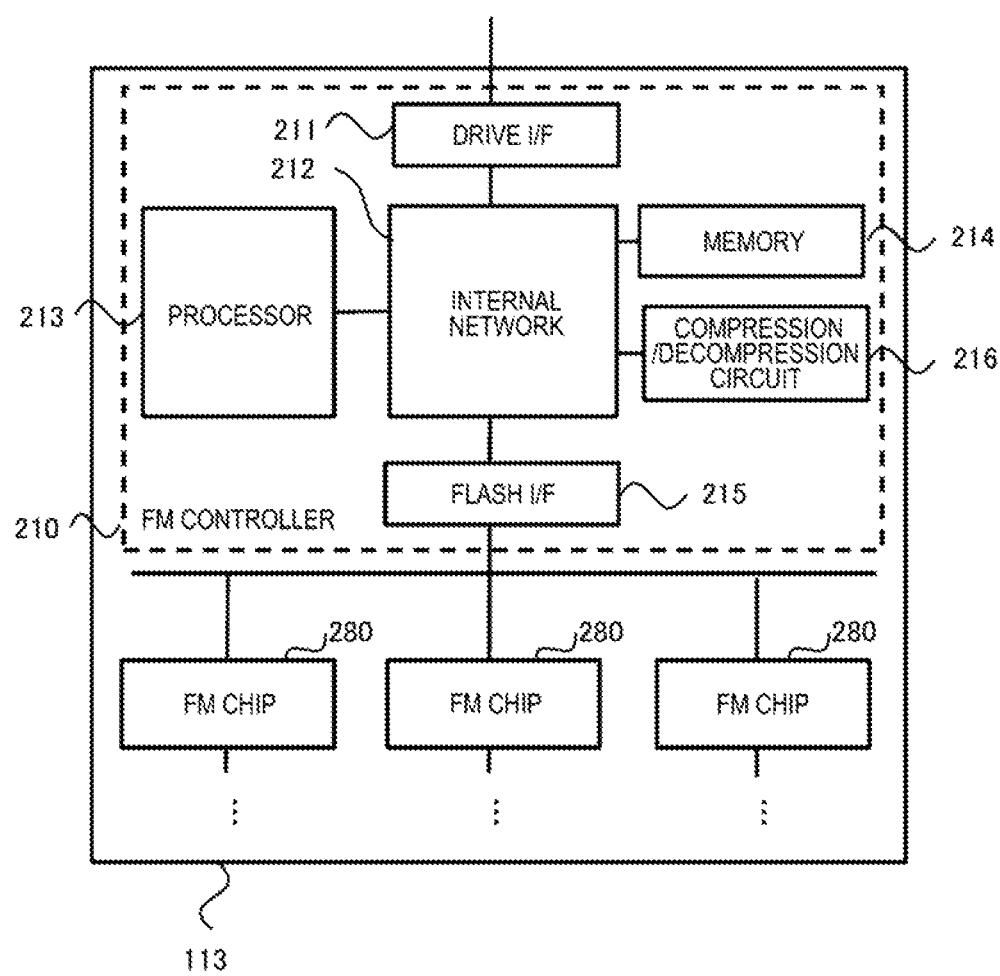
FIG. 3 is a schematic diagram of a flash memory package according to the first embodiment.

FIG. 3 is a schematic diagram of a flash memory package according to the first embodiment.

The FMPK 113 includes a flash memory (FM) controller 210 and a plurality of flash memory (FM) chips 280 which is a nonvolatile storage medium for storing data.

The FM controller 210 includes a drive interface (I/F) 211, a processor 213, a memory 214, a flash interface (I/F) 215, and a compression/decompression circuit 216. These components are connected to each other via an internal network 212. The FM controller 210 may not include the compression/decompression circuit 216.

The drive I/F 211 is an interface device for communicating the storage controller 109 of the storage device 104. The flash I/F 215 is an interface device for the FM controller 210 to communicate with the FM chip 280.

The memory 214 stores programs executed by the processor 213 and control information and the like used by the processor 213.

The processor 213 executes a program stored in a memory 214 of the FMPK 113 to thereby execute various processes (for example, processes corresponding to management of a storage area to be described later and an access request from the storage controller 109). For example, the processor 213 receives a read request or a write request from the storage controller 109 and executes a process corresponding to the received request. The processor 213 may receive a write request from the storage controller 109, complete the write request in a stage where data corresponding to the write request is written to the FM chip 280, and report completion of the write request to the storage controller 109. Moreover, the processor 213 may temporarily store data read or written between the storage controller 109 and the FM chip 280 in a buffer (not illustrated). Furthermore, the processor 213 may send a completion report of the write request to the storage controller 109 in a stage where the data corresponding to the write request from the storage controller 109 is written to a buffer.

The compression/decompression circuit 216 is a device that performs a data compression process and a data decompression process. The compression/decompression circuit 216 is implemented by hardware such as an application specific integrated circuit (ASIC), for example. The compression/decompression circuit 216 may be constituted by a CPU and a memory. In this case, the CPU may perform a data compression or decompression process by executing a program for a data compression and/or decompression process. Moreover, the processor 213 may perform a data compression or decompression process by executing a program for a data compression and/or decompression process. By doing so, the compression/decompression circuit 216 may not be provided in the FM controller 210.

In the computer system 100, when a compression/decompression process is executed according to a plurality of compression algorithms, the following three combinations may be used as a configuration for executing a compression/decompression process.

Configuration (1) using function of executing compression/decompression processes on the storage controller 109 side (inside the storage controller 109 or a range of devices connected to the storage controller 109 via the bus 112) and inside the FMPK 113

Configuration (2) using function of executing a plurality of compression/decompression processes on the storage controller 109 side Configuration (3) using function of executing a plurality of compression/decompression processes inside the FMPK 113

In the following description of the first embodiment, although configuration (1) using function of executing compression/decompression processes of the storage controller 109 side and inside the FMPK 113 is described as an example, another configuration may be used.

The storage device 104 generally has a volume virtualization function called thin-provisioning. In the volume virtualization, storage areas are controlled in units of pages. In the present embodiment, the size of a page is larger than the unit of erasure in the FM chip 280. The size of a page is 42 MB, for example. The size of a block which is the unit of I/O between the storage controller 109 and the FMPK 113 is 8 KB, for example.

Figure 4:
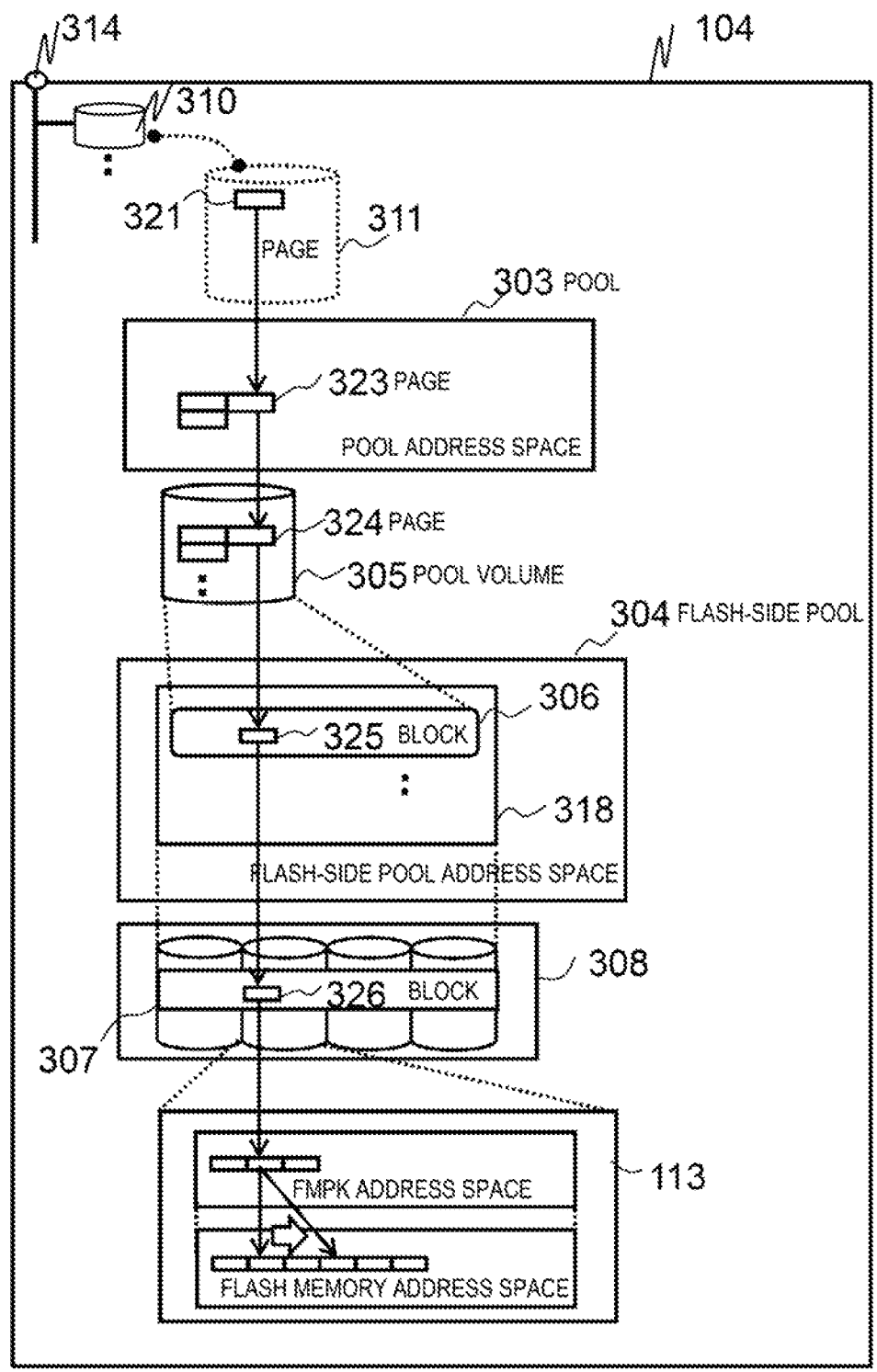
FIG. 4 is a diagram illustrating a storage state of data using a virtual volume, a pool, a flash-side pool, and a flash memory package in a storage device according to the first embodiment.

FIG. 4 is a diagram illustrating a storage state of data using a virtual volume, a pool, a flash-side pool, and a flash memory package in a storage device according to the first embodiment.

The storage device 104 includes one or more target devices 310 which is a storage area in which accesses from the host 101 are allowed. The target device 310 is correlated with a virtualized volume (a virtual volume) 311 and a logical volume. Moreover, the target device 310 is correlated with a communication port 314 of the host I/F 106.

The virtual volume 311 is a virtual storage area which is defined using a pool 303 and to which thin-provisioning and/or tiering. The virtual volume 311 includes one or more pages 321. The virtual volume 311 is an online volume.

The pool 303 is a set of pool volumes 305 used in thin-provisioning or tiering. A page 323 of the pool 303 is a storage area cut from the pool volume 305. The pool volume 305 is an offline volume. Due to this, the pool volume 305 is not correlated with the target device 310 designated from the host 101.

The pool volume 305 includes one or more pages 324. Although the page 323 of the pool 303 and the page 324 of the pool volume 305 are illustrated separately in FIG. 4 for description of concept, the pages are the same one.

The page 323 of the pool 303 is allocated to the page 321 of the virtual volume 311.

In the pool 303, a pool address space which is an address space on the pool 303 for mapping an address corresponding to a storage area of the virtual volume 311 and an address of an actual storage area is defined.

An actual storage area of the parity group (a RAID group) 308 is allocated to the page 323 via the flash-side pool 304.

The parity group 308 is defined using a plurality of FMPKs (storage devices) 113. In this way, RAID achieves high reliability, high speed, and large volume.

The storage area of the FMPK 113 is managed in units of blocks. The storage controller 109 accesses the FMPK 113 in units of blocks. A block 325 of the flash-side pool 304 is a virtual block seen from the storage controller 109. A block 326 of the parity group 308 is a block in which the storage controller 109 understands that data is actually stored.

The flash-side pool 304 includes one or more blocks 325. The page 323 of the pool 303 is correlated with a plurality of blocks 325. The data stored in the block 325 is stored in the block 326 in the FMPK 113.

In the FMPK 113, a flash memory address space is defined for a storage area of a plurality of FM chips 280.

In the FMPK 113, an FMPK address space for mapping a flash memory address space and an address space of the flash-side pool 304 is defined. That is, the block 325 of the flash-side pool 304 is mapped to the block 326 via the block of the FMPK address space. The FMPK address space is an address space of the FMPK 113 seen from the storage controller 109. For each FMPK 113, a flash memory address space and an FMPK address space are defined.

In one FMPK 113, a volume formed by the blocks of the FMPK address space may be larger than a volume formed by the blocks 326. The block 326 is a block of a flash memory address space. The FMPK 113 may be seen to the storage controller 109 as if it has a larger number of virtual blocks than an actual number of blocks. Due to this, a volume formed by virtual blocks is larger than a volume formed by actual blocks.

Upon receiving a write request that designates an address belonging to the block 325 to which the block 326 is not allocated from the storage controller 109, the FMPK 113 allocates the block 326 to the block 325. When data is overwritten to the block 325, the FMPK 113 secures a new block of the FM chip 280 for the block 326 in the FMPK 113, stores write data in the newly allocated block, and remaps the FMPK address space and the flash memory address space.

The parity group 308 is formed by a plurality of FMPKs 113 of the same type and the same communication interface, and a stripe line (a storage area) 307 extending across the FMPKs 113 is defined. The stripe line 307 stores host data and parity data (redundant data) having a redundant configuration capable of recovering lost data.

Redundant data that is not included in the page 321 of the virtual volume 311 may be stored in the page 323 of the pool 303.

The flash-side pool 304 is a virtual storage resource based on the parity group 308. In the flash-side pool 304, a flash-side pool address space for mapping an address space that manages a storage volume of the controller 109 side and an address space that manages a storage volume in the FMPK 113 is defined.

The mapping between the FMPK address space and the flash-side pool address space is maintained once determined (that is, static). Moreover, the mapping between the flash-side pool address space and the pool address space is static.

On the other hand, the pool address space is an address space of the pool 303 of which the address area is dynamically allocated to the virtual volume 311. Blocks that form the page 323 (324) are mapped to the blocks 325 of the flash-side Pool 304 in one-to-one correspondence. The block 325 is correlated with a storage area of the stripe line 307. Data stored in the block of the page 324 is stored in the stripe line 307 correlated with the block. A plurality of stripe lines 307 may be correlated with one page 324.

Read and write processes in the above-described configuration will be described.

A case in which the host 101 transmits an I/O command (a write command or a read command) that designates the target device 310 to the storage device 104 will be described as an example. Here, as described above, the virtual volume 311 is correlated with the target device 310.

Upon receiving a write command that designates the target device 310 correlated with the virtual volume 311, the storage device 104 selects a vacant page 323 from the pool 303 and allocates the page 323 to a write destination page 321 of the virtual volume 311.

The storage device 104 writes write data to the selected page 323. When data is written to the page 323, the data is written to the stripe line 307 correlated with the block 325 of the flash-side pool address space mapped to the page 323 and is also written to the FM chip 280 correlated with the stripe line 307. Specifically, the storage controller 109 retrieves a block of the FMPK address space to which the block 325 of the flash-side pool address space corresponding to the write destination page 323 is mapped and sends a read/write request for the retrieved block to the FMPK 113.

By arranging the units of data managed between the virtual volume 311 and the FMPK 113, the pool 303 and the flash-side pool 304 may be managed as one pool.

Here, processes for a case in which a compression function is provided on a storage controller side and data is stored in an FMPK according to a log structured system will be described. When data is stored according to the log structured system, if there is an overwrite request for a certain page 321 of a virtual volume, the storage controller compresses a target write data of the overwrite request and stores compressed data in a new page 323 different from the page 323 of the pool 303 allocated to the page 321 of the virtual volume. The new page 323 is a vacant page that is not allocated to any page of the virtual volume 311. Subsequently, the storage controller allocates the new page 323 having data stored therein to the page 321 of the virtual volume.

By this overwrite process, the page 323 in which old data is stored becomes an invalid area (that is, garbage). Due to this, the storage controller needs to execute a garbage collection process for changing garbage to a vacant area when a total amount of accumulated garbage reaches a predetermined amount. Therefore, the load for executing a garbage collection process is applied to the storage controller.

In the configuration illustrated in FIG. 4, processes when there is an overwrite request will be described.

When there is an overwrite request for a certain page 321 of the virtual volume 311 from the host 101, the storage controller 109 compresses target write data of the overwrite request on the storage controller 109 side and writes the write data to the block 325 of the flash-side pool 304 statically mapped to the page 323 of the pool 303 allocated to the page 321 of the virtual volume 311. That is, the storage controller 109 transmits a write request for the block 325 of the flash-side pool 304 to the FMPK 113. As a result, the FMPK 113 performs a write process act the write request. When storing data in a physical FM chip 280, the FMPK 113 stores data in a new area and remaps the new area to a block of the FMPK address space.

By this process, garbage is not accumulated in the pool 303 unlike a case in which data is stored in the FMPK according to the log structured system. Due to this, it is not necessary to execute a garbage collection process of the storage controller 109 and to reduce overhead due to the garbage collection process and distribute resources of the storage controller 109 corresponding to the reduction in the overhead to I/O processes. Therefore, is possible to improve an I/O processing performance.

With the above-described configuration, it is possible to offload the overhead of the garbage collection process to the FMPK 113 side.

Figure 5:
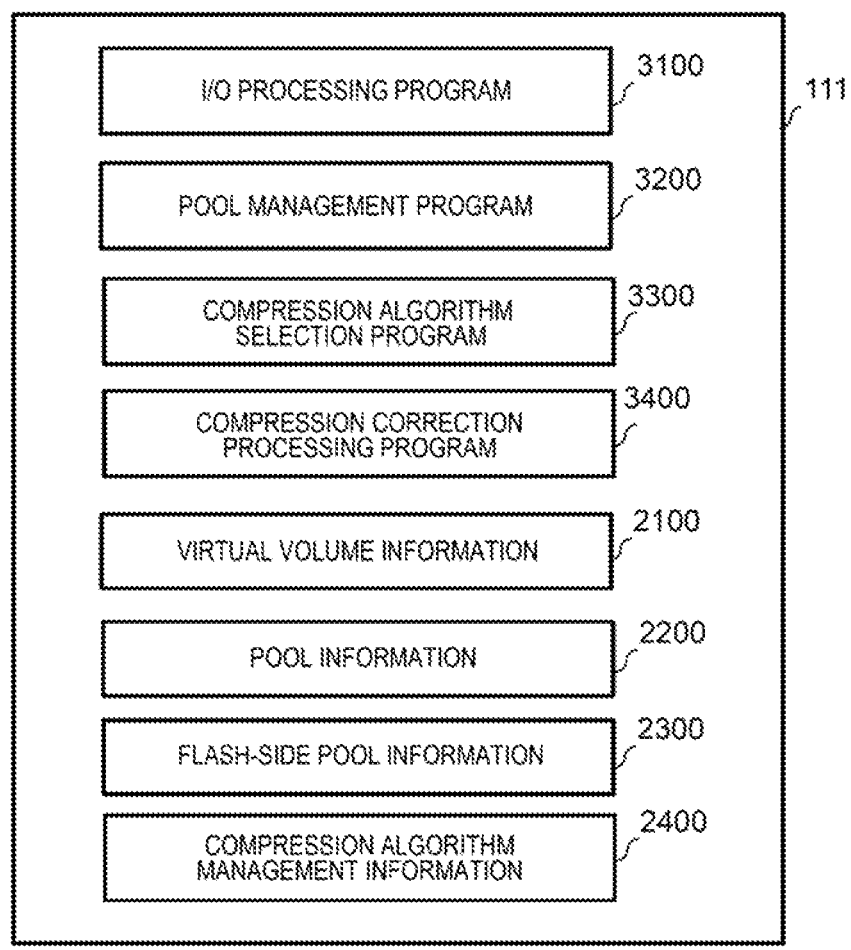
FIG. 5 is a schematic diagram of a shared memory according to the first embodiment.

FIG. 5 is a schematic diagram of a shared memory according to the first embodiment.

The shared memory 111 of the storage device 104 stores program modules including an I/O processing program 3100, a pool management program 3200, a compression algorithm selection program 3300, and a compression correction processing program 3400. Moreover, the shared memory 111 stores virtual volume information 2100, pool information 2200, flash-side pool information 2300, and compression algorithm management information 2400 which are referred to by programs, for example.

The I/O processing program 3100 is a program for performing processes related to I/O such as storing data after compression to an actual page. The pool management program 3200 is a program for performing processes related to pool management such as selecting an actual page. The content of processes performed by the compression algorithm selection program 3300 and the compression correction processing program 3400 will be described later.

Programs and information stored in the shared memory 111 are loaded to the local memory 114 of the storage controller 109 and are then executed by the process 105 and used for processing as necessary.

Figure 6:
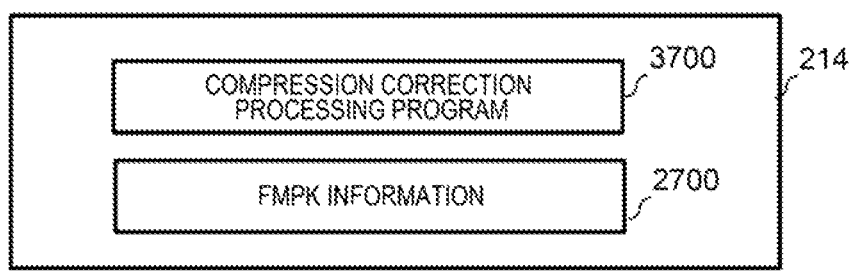
FIG. 6 is a schematic diagram of a memory of an FMPK according to the first embodiment.

FIG. 6 is a schematic diagram of a memory of an FMPK according to the first embodiment.

The memory 214 of the FMPK 113 stores compression correction processing program 3700 and FMPK information 2700. The content of processing of the compression correction processing program 3700 will be described later.

Next, information stored in the shared memory 111 of the storage device 104 and the memory 214 of the FMPK 113 will be described.

Figure 7:
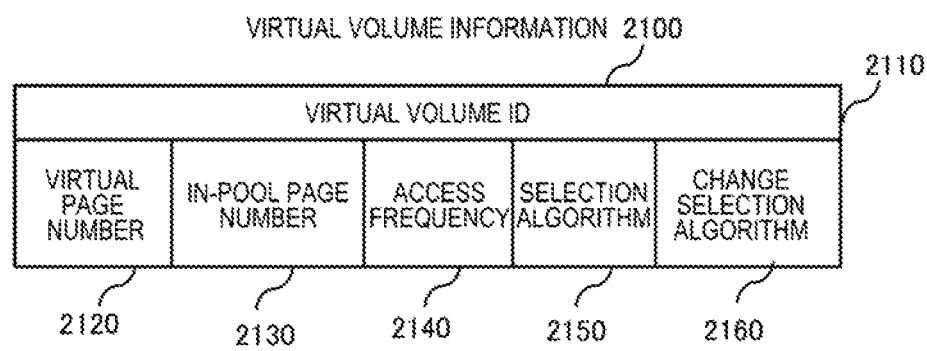
FIG. 7 is a schematic diagram of virtual volume information according to the first embodiment.

FIG. 7 is a schematic diagram of virtual volume information according to the first embodiment.

The virtual volume information 2100 is information for managing the virtual volume 311. In the shared memory 111, one piece of virtual volume information 2100 is stored for one virtual volume 311 of the storage device 104.

The virtual volume information 2100 includes the fields of a virtual volume ID 2110, a virtual page number 2120, an in-pool page number 2130, an access frequency 2140, a selection algorithm 2150, and a change selection algorithm 2160. The set of fields of the virtual page number 2120, the in-pool page number 2130, the access frequency 2140, the selection algorithm 2150, and the change selection algorithm 2160 is provided in correspondence to each virtual page.

A number that identifies a virtual volume is stored in the virtual volume ID 2110. The number of a page (a virtual page) that forms a virtual volume is stored in the virtual page number 2120. A number (a rounded-up number if it is indivisible) of virtual pages corresponding to a division of the volume of a virtual volume by one page size is registered in the virtual volume.

The number of a page of the pool 303 allocated to a virtual page is stored in the in-pool page number 2130. When an actual page is not allocated to a virtual page, information (for example, "N/A") indicating that there is no corresponding actual page is stored in the in-pool page number 2130.

Information used for determining whether the number of accesses per unit time with respect to a virtual page is large is stored in the access frequency 2140. The number of read/write requests to a virtual page in a predetermined time range, for example, may be acquired and registered in the access frequency 2140. Alternatively, the number of read requests and the number of write requests may be registered, and the proportion of the number of read/write requests to a virtual page with respect to the entire number of read/write requests may be registered.

Compression algorithm information used when a compression function is applied to data of a virtual page is stored in the selection algorithm 2150. The compression algorithm information may be a compression algorithm number stored in a compression algorithm information table 2400. Information on a compression algorithm (an appropriate algorithm) after change when a compression algorithm for data of a target page is changed is stored in the change selection algorithm 2160.

Figure 8:
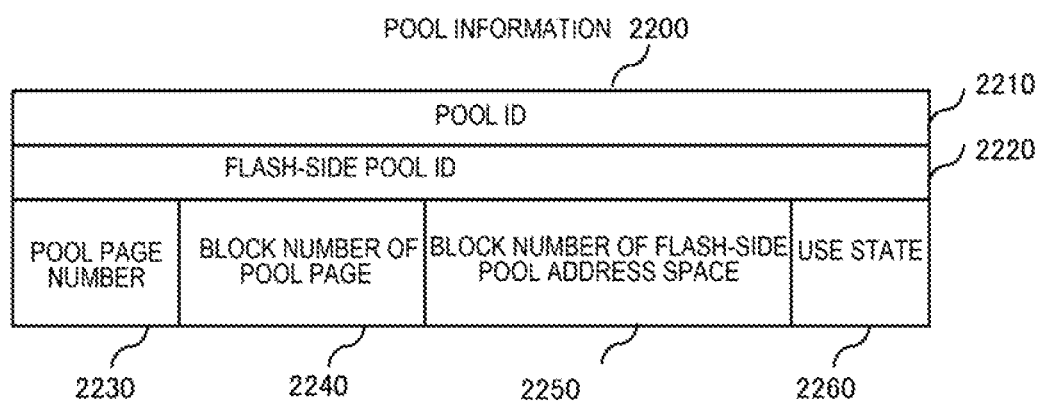
FIG. 8 is a schematic diagram of pool information according to the first embodiment.

FIG. 8 is a schematic diagram of pool information according to the first embodiment.

The pool information 2200 is information for managing the pool 303. In the shared memory 111, one piece of pool information 2200 is stored for one pool 303 of the storage device 104.

The pool information 2200 includes the fields of a pool ID 2210, a flash-side pool ID 2220, a pool page number 2230, a pool page block number 2240, a flash-side pool address space block number 2250, and a use state 2260. The set of fields of the pool page number 2230, the pool page block number 2240, the flash-side pool address space block number 2250, and the use state 2260 is provided in correspondence to each page of the pool 303.

Information (a pool ID) of the number that identifies a pool is stored in the pool ID 2210. An identification number indicating a flash-side pool space corresponding to a pool is stored in the flash-side pool ID 2220. The number (a pool page number) of a page that forms a pool is stored in the pool page number 2230. A block number included in a page corresponding to a pool page number is stored in the pool page block number 2240. The block number of the flash-side pool 304 corresponding to a block included in a page of a pool is stored in the flash-side pool address space block number 2250. Information indicating a state (in-use state) in which a page corresponding to a pool page number of the pool page number 2230 is allocated to a virtual page or a non-allocated state (a non-use state) is stored in the use state 2260. In the related art, information indicating whether a page corresponding to the pool page number of the pool page number 2230 is an invalid area is stored in the use state 2260. When information indicating an in-use state is stored, information indicating a virtual volume in which a pool page is allocated to a virtual page thereof may be further stored in the use state 2260.

Figure 9:
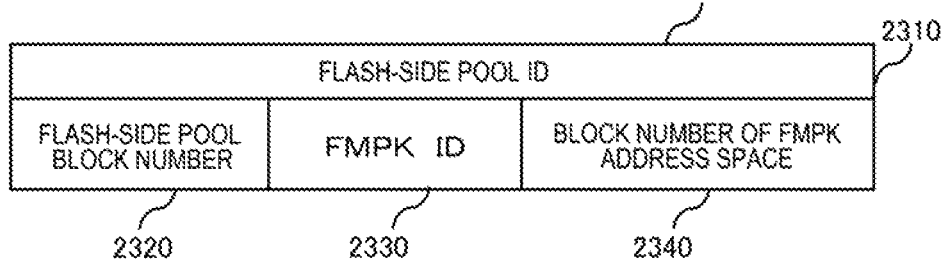
FIG. 9 is a schematic diagram of flash-side pool information according to the first embodiment.

FIG. 9 is a schematic diagram of flash-side pool information according to the first embodiment.

The flash-side pool information 2300 is information for managing the flash-side pool 304. The flash-side pool information 2300 manages mapping between the flash-side pool address space and the flash package address space. In the shared memory 111, one piece of flash-side pool information 2300 is stored for one flash-side pool 304 of the storage device 104.

The flash-side pool information 2300 includes the fields of a flash-side pool ID 2310, a flash-side pool block number 2320, an FMPK ID 2330, and an FMPK address space block number 2340. The set of fields of the flash-side pool block number 2320, the FMPK ID 2330, and the FMPK address space block number 2340 is provided in correspondence to each block of the flash-side pool.

An identifier (a flash-side pool ID) of the flash-side pool 304 is stored in the flash-side pool ID 2310. The number of a block (a flash-side pool block) which is the unit of management of the flash-side pool address space is stored in the flash-side pool block number 2320. The number of this block is the number of a flash-side pool block corresponding to the stripe line of the parity group 308. An identifier (an FMPK ID) of an FMPK in which a flash-side pool block is stored is stored in the FMPK. ID 2330. The number of a block of an FMPK address space mapped to the block of the block number of the flash-side pool block number 2320 is stored in the FMPK address space block number 2340.

FIG. 10 is a schematic diagram of compression algorithm information according to the first embodiment.

The compression algorithm information 2400 is information on a compression algorithm of data applicable inside the storage device 104. The compression algorithm information 2400 includes the fields of an algorithm number 2410, an algorithm name 2420, and an application condition 2430 for each compression algorithm.

A number corresponding to a compression algorithm is stored in the algorithm number 2410. The name (an algorithm name) of a compression algorithm is stored in the algorithm name 2420. A condition (an application condition) to which a compression algorithm is applied is stored in the application condition 2430. The application condition may be a condition related to an access frequency for a storage area in which data is stored, for example.

In the compression algorithm 2400 illustrated in FIG. 10, two compression functions of algorithm 1 and algorithm 2 are provided in the storage device 104. Algorithm 1 (an example of a first compression algorithm) is an algorithm called Zstandard (Zstd) and is applied to data having a low access frequency. Algorithm 2 (an example of a second compression algorithm) is an algorithm called LZ4 and is applied to data having a high access frequency. A low access frequency may be a case in which the number of I/Os per unit time with respect to a target storage area is smaller than a predetermined threshold. Here, Zstd is an algorithm which has a higher compression ratio than LZ4 and in which the overhead of a compression/decompression process is large.

FIG. 11 is a schematic diagram of FMPK information according to the first embodiment.

The FMPK information 2700 is information stored in the memory 214 of each FMPK 113 and manages mapping between the FMPK address space and the flash memory address space. The FMPK information 2700 is not accessed from the storage controller 109.

The FMPK information 2700 includes the fields of an FMPK. ID 2710, an FMPK group ID 2720, an FMPK address space block number 2730, a flash memory address space block number 2740, and a size after compression 2750. The set of fields of the FMPK address space block number 2730, the flash memory address space block number 2740, and the size after compression 2750 is provided in correspondence to each block of the FMPK address space.

An identifier (an FMPK ID) of the FMPK 113 is stored in the FMPK ID 2710. A flash-side pool ID of the flash-side pool 304 corresponding to the parity group 308 to which the FMPK 113 belongs is stored in the FMPK group ID 2720. The number of a block in an address space (an FMPK address space) for managing the volume of an FMPK in units of blocks is stored in the FMPK address space block number 2730.

The number of a block in an address space (a flash memory address space) for managing the volume of the FM chip 280 of the FMPK 113 in units of blocks is stored in the flash memory address space block number 2740. Specifically, information indicating a storage location of the physical FM chip 280 correlated with the block corresponding to the block number of the FMPK address space block number 2730 is stored in the flash memory address space block number 2740. When data is stored first in a vacant block of the FMPK address space, the block number of the flash memory address space in which data is actually stored is allocated to the number of this block.

The size of compressed data stored in the block of the FMPK address space is stored in the size after compression 2750. For example, the size of data compressed by the storage controller 109 is received from the storage controller 109 and is stored in the size after compression 270.

An example of a data compression/decompression function of the storage device 104 according to the present embodiment will be described.

In the present embodiment, the storage controller 109 and the FMPK 113 have compression/decompression functions based on different compression algorithms. A compression algorithm (a first compression algorithm) of the compression/decompression function provided in the storage controller 109 is an algorithm in which a compression process takes longer time than the compression/decompression function provided in the FMPK 113 and a compression ratio is high and which is effective for data having a low access frequency. On the other hand, a compression algorithm (a second compression algorithm) of the compression/decompression function provided in the FMPK 113 is an algorithm in which a compression ratio is low but a compression process takes short time and which is effective for data having a high access frequency. For example, algorithm 1 may be applied to those (for example, databases and the like) that require a high compression ratio. In this example, the processor 105 of the storage controller 109 corresponds to a first data compression unit and the compression/decompression circuit 216 of the FMPK 113 corresponds to a second data compression unit.

According to this configuration, by offloading a compression process for some data to the FMPK 113, it is possible to reduce the load associated with a compression process of the processor 105 of the storage controller 109 and to improve the performance of an overall I/O process of the storage device 103.

Next, a processing operation of the storage device 104 will be described.

Figure 12:
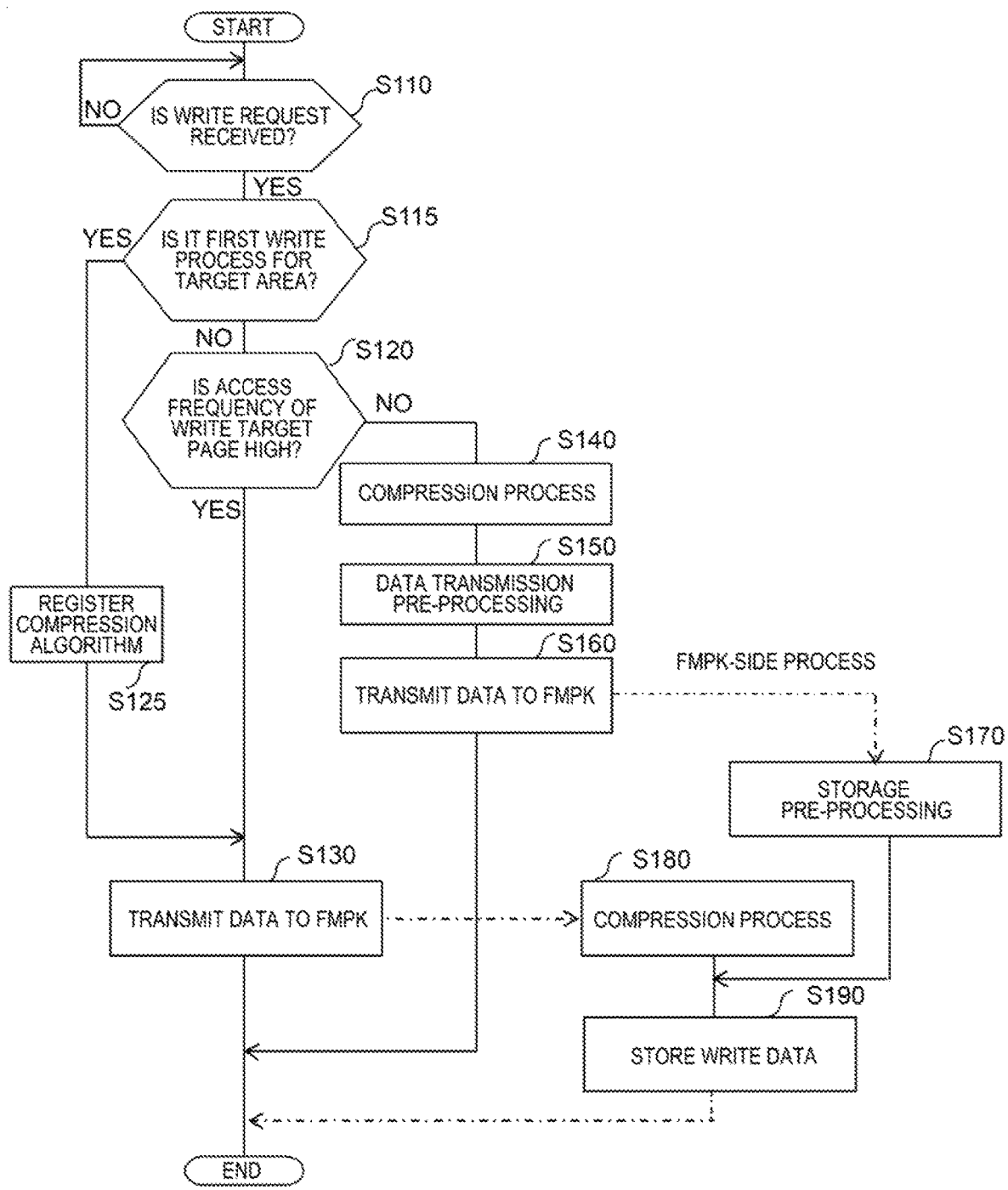
FIG. 12 is a flowchart of a write process according to the first embodiment.

FIG. 12 is a flowchart of a write process according to the first embodiment.

The storage device 104 determines whether a write request is received from the host 101 (S110). When the write request is not received (S110: NO), S110 is executed repeatedly. On the other hand, when the write request is received (S110: YES), the pool management program 3200 specifies a virtual page corresponding to a logical unit (LU: corresponding to a virtual volume ID) and a write range (for example, a logical block address (LBA) or the like) designated by the write request.

Subsequently, the pool management program 3200 specifies virtual volume information 2100 corresponding to the designated LU and retrieves and specifies the number of a virtual page (hereinafter referred to as a target virtual page in description of this process) serving as a target of the write process within a virtual volume based on LBA using the virtual volume information 2100. Subsequently, the pool management program 3200 determines whether this write process is the first write process for a target virtual page (a target area) by determining an in-pool page number is stored in the in-pool page number 2130 corresponding to the virtual page number 2120 in which the specified virtual page number is stored (S115). For example, when the in-pool page number is not stored in the in-pool page number 2130 corresponding to the virtual page number 2120, this write process is the first write process for the target virtual page.

As a result, when this write process is the first write process (S115: YES), the pool management program 3200 registers a page number in the pool 303 corresponding to a page of which the use state 2260 in the pool information 2200 is a vacant state in the in-pool page number 2130 and registers a default compression algorithm (for example, a compression algorithm when the access frequency is high) in the selection algorithm 2150 corresponding to the target virtual page (S125). After that, the flow proceeds to S130.

On the other hand, when this write process is not the first write process (S115: NO), the pool management program 3200 determines whether the access frequency is high based on the value of the access frequency 2140 corresponding to the target virtual page (S120). When it is determined that the access frequency is high (S120: YES), the flow proceeds to S130 so that the FMPK 113 performs a compression process on the data (write data) corresponding to the write request. On the other hand, when it is determined that the access frequency is low (S120: NO), the flow proceeds to S140. Since the access frequency with respect to the virtual page cannot be determined correctly if the monitoring period is short, the same process as that when it is determined that the access frequency is high may be performed when the monitoring period is short.

In S130, the I/O processing program 3100 transmits a write request for a block (a target block) in a page of a pool allocated to the virtual page to the FMPK 113 together with write data and an instruction to cause the FMPK 113 to perform a compression process (the instruction may be information corresponding to an instruction to perform a compression process and information with which it can be determined that a compression process is to be performed by the FMPK 113) (S130). When a write request is transmitted in this manner, the I/O processing program 3100 calculates a target block in the following manner. That is, the I/O processing program 3100 specifies an in-pool page number (a page number of the in-pool page number 2130 corresponding to a virtual page) allocated to the virtual page and calculates a block number (a block number of the block number 2240 of a pool page corresponding to the pool page number 2230 in which the page number is stored) corresponding to the page number. A flash memory address corresponding to a block number of the block number 2250 of the flash-side pool address space corresponding to the block number of the block number 2240 of the pool page is an actual area in which the write data is stored.

When the FMPK 113 receives the write request and the compression instruction transmitted in S130, the FMPK 113 recognizes that the FMPK 113 itself has to perform a compression process on write data and performs a compression process on the write data according to a predetermined compression algorithm (S180). When a compression process is performed, the size of write data becomes smaller than a block size at the time of transmission. The processor 213 of the FMPK 113 writes the compressed data in a target storage area of the FM chip 280 corresponding to the write request (S190) and reports completion of the write process to the storage controller 109. The timing of reporting completion of the write process may be the timing at which reception of the write data from the storage controller 109 transmitted in S130 and temporary storage in a buffer (not illustrated) is completed.

In S140, the pool management program 3200 performs a compression process on the write data according to a predetermined compression algorithm.

Here, the write process performed by the FMPK 113 is performed in units of blocks in a page of a pool allocated to the virtual page. Therefore, the compression correction processing program 3400 performs pre-processing before transmitting the write data to the FMPK 113 (S150). In this pre-processing, when the data size of the write data (compressed data) after the compression process becomes smaller than the block size which is the unit of transmission, the compressed data is corrected so that the size thereof is equal to the block size. Here, the reason why this pre-processing is performed is because if this pre-processing is not performed, information stored in a vacant area of a block in which compressed data is not stored is stored in the FMPK 113, and when data stored in this block is read, incorrect data is read from a portion of this block. Therefore, when the data size of the compressed data is smaller than the size of a block, the compression correction processing program 3400 embeds predetermined data (for example, all-zero ('0') data: adjustment data) in a portion in which compressed data is not stored to form data having the block size.

After that, the I/O processing program 3100 transmits data of a block containing the compressed data and information (compression size information) of the size (the size after compression of the write data) of the compressed data to the FMPK 113 together with the write request (S160).

When the FMPK 113 receives the write request and the like transmitted in S160, the FMPK 113 registers the received size after compression in the size after compression 2750 corresponding to the block number of the target FMPK address space of the write request, and the compression correction processing program 3700 performs pre-processing for storing the write data in the FM chip 280 which is an actual area (S170). Specifically, the FMPK 113 recognizes that data compressed and corrected by the storage device 104 is transmitted upon receiving the size-after-compression information, for example. By referring to the size-after-compression information, the compression correction processing program 3700 determines a range of valid data corresponding to the compressed data of the write data within the transmitted block-based data and a range of adjustment data embedded after the valid data. The compression correction processing program 3700 removes the adjustment data from the received block-based data and extracts valid data (compressed data).

Subsequently, the processor 224 of the FMPK 113 writes the compressed data extracted in S170 to the target storage area of the FM chip 280 (S190) and reports completion of the write process to the storage controller 109. The timing of reporting completion of the write process may be the timing at which reception of the write data from the storage controller 109 transmitted in S160 and temporary storage in a buffer (not illustrated) is completed.

In S190, when data is written to the FM chip 280, the processor 224 of the FMPK 113 performs a process of securing a new area of the FM chip 280 and storing data. This is the same process as the writing process of the FM chip 280. After that, the FMPK 113 remaps the address of the secure new area to the FMPK address corresponding to the write request. The FMPK 113 manages the storage area of the FM chip 280 in which old write data as a garbage (an invalid area). The garbage collection process may be executed as a background process when an operation rate of the processor 224 of the FMPK 113 is low. By doing so, a vacant area is generated from the garbage to increase the volume of the storage area that the FM chip 280 can access. In the above-described process, since only the compressed data is stored in the actual area of the FM chip 280, the volume efficiency of the FM chip 280 can be increased.

Figure 13:
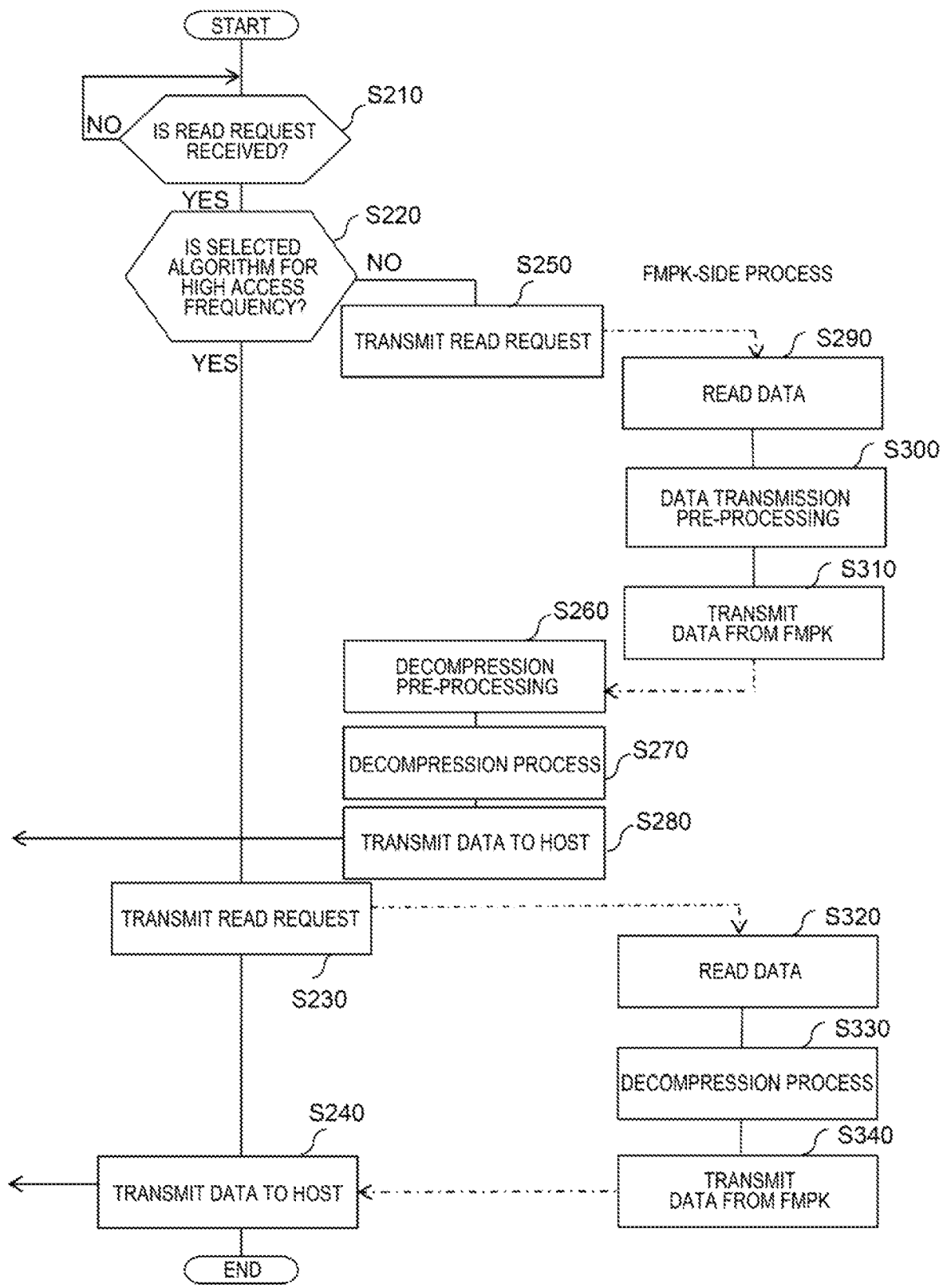
FIG. 13 is a flowchart of a read process according to the first embodiment.

FIG. 13 is a flowchart of a read process according to the first embodiment.

The storage device 104 determines whether a read request is received from the host 101 (S210). When the read request is not received (S210: NO), S210 is executed repeatedly. When the read request is received (S210: YES), the pool management program 3200 specifies a virtual page corresponding to an LU (corresponding to a virtual volume ID) and a read range (for example, an LEA or the like) designated by the read request.

Subsequently, the pool management program 3200 specifies the virtual volume information 2100 corresponding to the designated LU and retrieves and specifies the number of a virtual page (hereinafter referred to as a target virtual page in the description of this process) serving as a target of the read process within a virtual volume based on the LBA using the virtual volume information 2100.

Subsequently, the pool management program 3200 determines whether a compression algorithm applied to the target virtual page is an algorithm (in this example, algorithm 2) for data having a high access frequency by referring to the information registered in the selection algorithm 2150 corresponding to the virtual page number 2120 in which the specified virtual page number is stored (S220).

As a result, when it is determined that the compression algorithm applied to the target virtual page is an algorithm for data having a high access frequency (S220: YES) (that is, when the compression algorithm is algorithm 2), the pool management program 3200 proceeds to S230. When it is determined that the compression algorithm applied to the target virtual page is not the algorithm for data having a high access frequency (S220: NO) (that is, when the compression algorithm is algorithm 1), the pool management program 3200 proceeds to S250.

In S230, since data of a read target (reading target data) is compressed by the FMPK 113, the I/O processing program 3100 transmits a read request for a block in a page of a pool allocated to the target virtual page to the FMPK 113 together with an instruction to cause the FMPK 113 to perform a decompression process (S230).

Upon receiving the read request transmitted in S230, the FMPK 113 recognizes that the read request is a read process that involves a decompression process, retrieves a storage location of the reading target data, reads the reading target data from the FM chip 280, and stages the read reading target data in a cache memory (not illustrated) of the FMPK 113 (S320). Subsequently, the compression/decompression circuit 216 performs a decompression process on the reading target data stages in the cache memory (S330). Subsequently, the FMPK 113 transmits the decompressed reading target data to the storage controller 109 (S340). The reading target data transmitted to the storage controller 109 is transmitted to the host 101 (S240), and the read process ends.

In S250 (when it is determined in S220 that the applied compression algorithm is algorithm 1 for data having a low access frequency), the I/O processing program 3100 transmits a read request to the FMPK 113. In this case, since the compression process on the reading target data is performed by the storage controller 109, the I/O processing program 3100 informs the FMPK 113 of the fact that the compression process on the reading target data is performed on the storage controller 109 side.

Upon receiving the read request transmitted in S250, the FMPK 113 retrieves a storage location of the reading target data and stages the read request data from the FM chip 280 to the cache memory of the FMPK 113 (S290). Here, since the reading target data staged in the cache memory is compressed by the storage controller 109, the data size is generally smaller than the block size of blocks used for data communication with the storage controller 109. The data size of the data staged in the cache memory is referred to as a compressed data size.

The compression correction processing program 3700 corrects the reading target data by embedding adjustment data (for example, 0 (zero) data) in an area smaller than the block size in order to fit the size of the reading target data to the block size used for data transmission with the storage controller 109 (S300).

Subsequently, the FMPK 113 transmits the corrected reading target data and the compressed data size (that is, the size of a portion which is not adjusted by the adjustment data) to the storage controller 109 (S310).

When the storage controller 109 receives the reading target data transmitted in S310, the compression correction processing program 3400 performs decompression pre-processing of removing the adjustment data corrected on the FMPK 113 side (S260), performs a decompression process (a decompression process corresponding to algorithm 1) on the reading target data from which the adjustment data is removed by the pool management program 3200 (S270), and transmits the decompressed reading target data to the host 101 (S280). In this way, the read process ends.

Next, a compression algorithm change determination process of determining whether a compression algorithm for the data stored in the FMPK 113 will be changed will be described.

Figure 14:
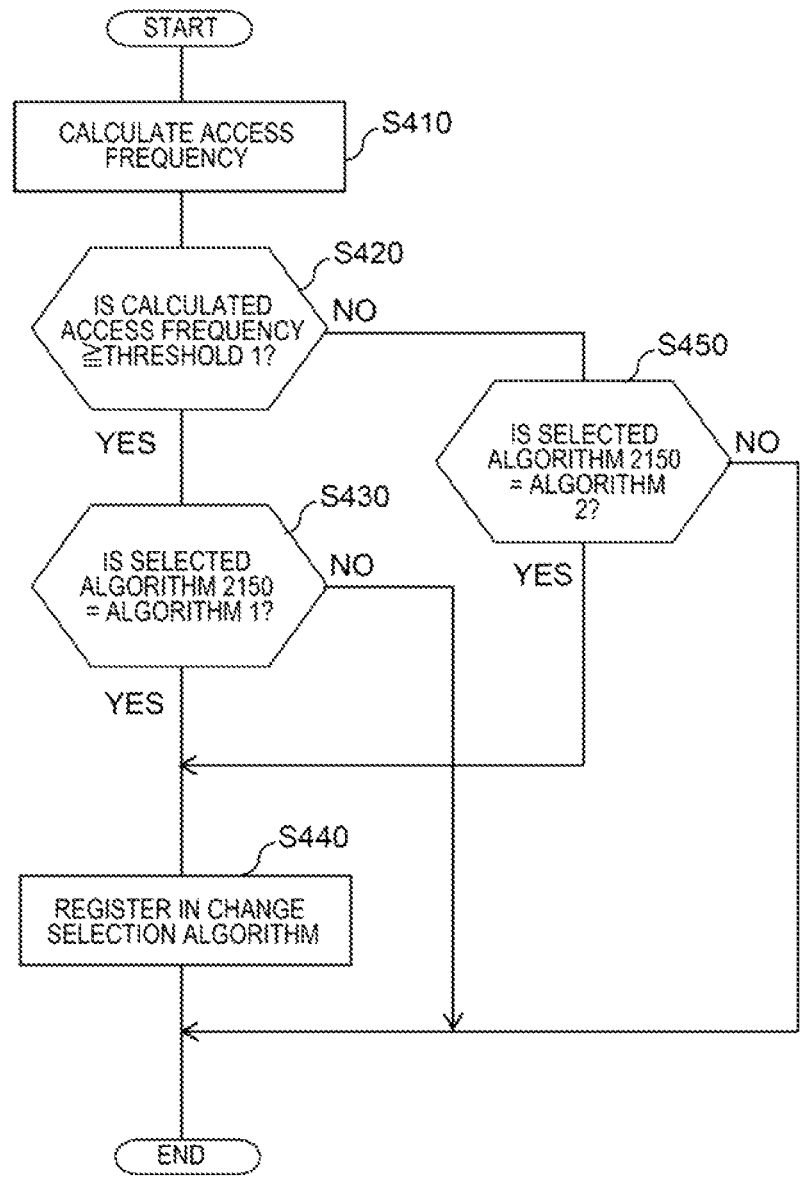
FIG. 14 is a flowchart of a compression algorithm change determination process according to the first embodiment.

FIG. 14 is a flowchart of a compression algorithm change determination process according to the first embodiment.

For example, an automated layer control function of the storage device 104 monitors the access frequency of each data chunk. For example, the storage device 104 counts the number of I/Os in a predetermined period (for example, everyday) with respect to a target page in units of pages which is the units handled by a volume virtualization function and calculates the access frequency for each page as "(number of I/Os)/(period)=(access frequency)". Subsequently, the storage device 104 stores page data to a storage medium having a higher performance and a short response time, starting with a page having a high access frequency based on the calculation result.

Here, the storage device 104 executes a compression algorithm change determination process with respect to each page (each virtual page) of a virtual volume as a processing target. First, the storage device 104 calculates the access frequency of pages on a daily basis using the automated layer control function (S410).

Subsequently, the compression algorithm selection program 3300 determines whether the access frequency calculated for a processing target page (a target page) is equal to or higher than a predetermined threshold (threshold 1) (S420).

As a result, when the access frequency is equal to or higher than threshold 1 (S420: YES), the compression algorithm selection program 3300 selects an algorithm number (in the example of FIG. 10, algorithm 2: appropriate algorithm) corresponding to an algorithm applied when the access frequency is high among the algorithm numbers stored in the algorithm number 2410 of the compression algorithm information 2400. Subsequently, the compression algorithm selection program 3300 determines whether the selected algorithm is an algorithm (algorithm 1) applied when the access frequency is low by referring to the selection algorithm of the selection algorithm 2150 corresponding to the target page (S430).

As a result, when the selection algorithm is an algorithm (algorithm 1) applied when an access frequency is low (S430: YES), the previous access frequency of a target page is lower than threshold 1 and the present access frequency is equal to or higher than threshold 1. Thus, it is necessary to change the compression algorithm to an algorithm (algorithm 2) applied when an access frequency is high. Therefore, the compression algorithm selection program 3300 registers the number of an algorithm applied when the access frequency is hi in the change selection algorithm 2160 corresponding to the target page (S440). After that, the process ends.

On the other hand, when the selection algorithm is not an algorithm (algorithm 1) applied when the access frequency is low (S430: NO), since the algorithm applied to the target page is an algorithm (algorithm 2) applied when the access frequency is low, it is not necessary to change the compression algorithm, and the process ends.

On the other hand, when the access frequency is lower than threshold 1 (S420: NO), the compression algorithm selection program 3300 selects an algorithm number (in the example of FIG. 10, algorithm 1: appropriate algorithm) corresponding to the algorithm applied when the access frequency is low among the algorithm numbers stored in the algorithm number 2410 of the compression algorithm information 2400. Subsequently, the compression algorithm selection program 3300 determines whether the selection algorithm is an algorithm (algorithm 2) applied when the access frequency is high by referring to the selection algorithm of the selection algorithm 2150 corresponding to the target page (S450).

As a result, when the selection algorithm is an algorithm (algorithm 2) applied when the access frequency is high (S450: YES), the previous access frequency of the target page is equal to or higher than threshold 1 and the present access frequency is lower than threshold 1. Thus, it is necessary to change the compression algorithm to an algorithm (algorithm 1) applied when the access frequency is low. Therefore, the compression algorithm selection program 3300 registers the number of an algorithm applied when the access frequency is low in the change selection algorithm 2160 corresponding to the target page (S440). After that, the process ends.

On the other hand, when the selection algorithm is not an algorithm (algorithm 2) applied when the access frequency is high (S450: NO), since the algorithm applied to the target page is an algorithm (algorithm 1) applied when the access frequency is low, it is not necessary to change the compression algorithm, and the process ends.

According to the above-described process, it is possible to appropriately determine an appropriate compression algorithm to be used subsequently for each page based on the access frequency for the page. At the ending time point of this process, the data stored in the FMPK 113 is data that is compressed by the compression algorithm selected previously (the compression algorithm of the selection algorithm 2150). Hereinafter, a compression algorithm change main process of compressing the data stored in the FMPK 113 according to an appropriate compression algorithm will be described.

Figure 15:
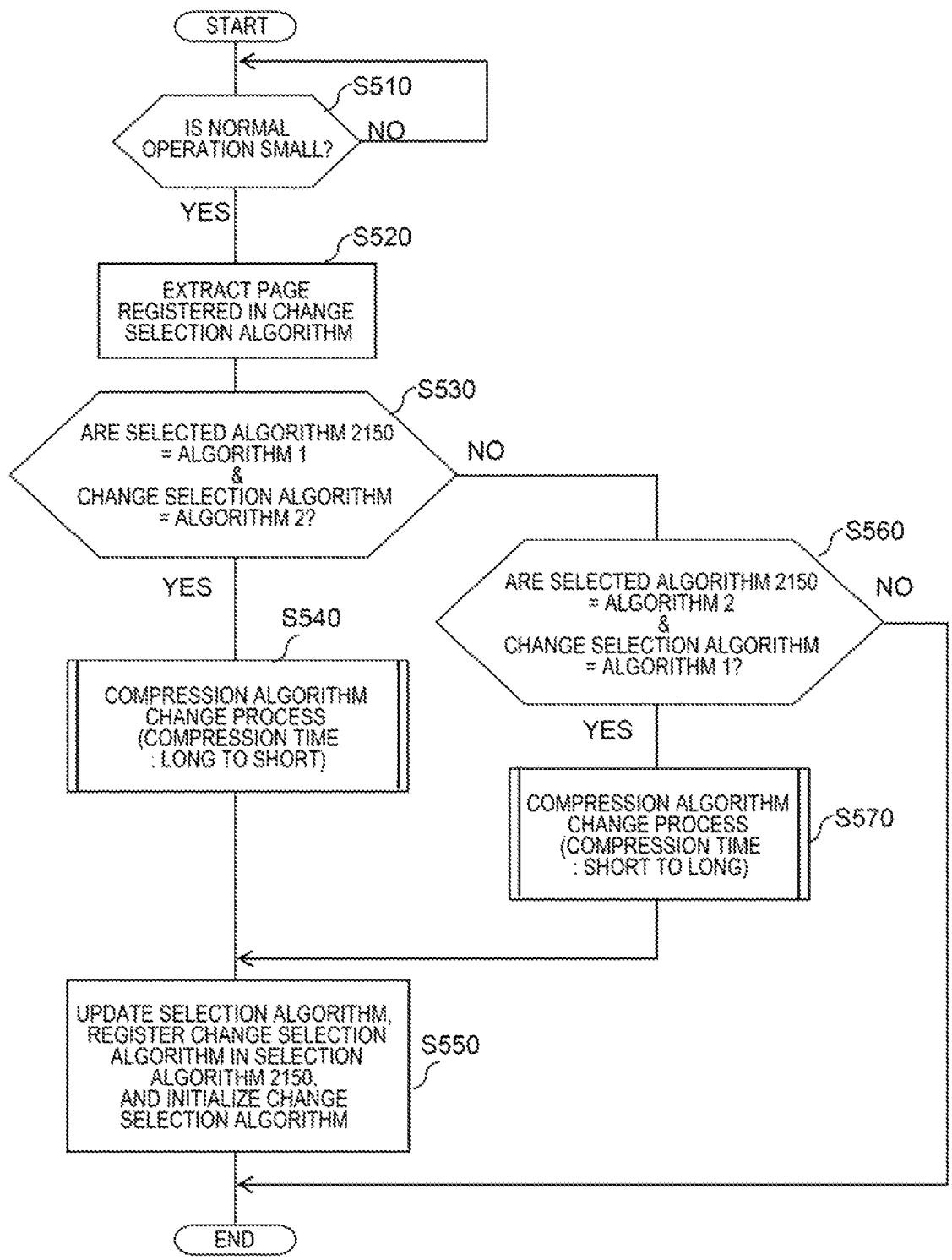
FIG. 15 is a flowchart of a compression algorithm change main process according to the first embodiment.

FIG. 15 is a flowchart of a compression algorithm change main process according to the first embodiment.

The compression algorithm change main process is a process of changing a compression algorithm applied to a virtual page to a change selection algorithm registered in the compression algorithm change determination process illustrated in FIG. 14. Here, changing the compression algorithm means temporarily reading data written to the FM chip 280 corresponding to an actual page allocated to the virtual page, compressing the data using a new compression algorithm, and writing the compressed data in the FM chip 280 again.

The compression algorithm change process is processed in the background.

First, the pool management program 3200 determines whether the number of I/Os of a normal operation is small every predetermined periods (S510). Specifically, the pool management program 3200 determines whether an operation rate of the processor 105 is lower than a predetermined setting value.

As a result, when the operation rate of the processor 105 is not lower than a predetermined setting value (S510: NO), since the number of I/Os of a normal operation is large, the pool management program 3200 does not execute processing so that the normal operation is not affected and the flow proceeds to S510.

On the other hand, when the operation rate of the processor 105 is lower than the setting value (S510: YES), since the number of I/Os of the normal operation is small, the pool management program 3200 extracts a virtual page of which the compression algorithm is registered in the change selection algorithm 2160 of the virtual volume information 2100 as a processing target (S520). As a method of extracting the virtual page, for example, virtual pages of which the compression algorithm names are registered in the change selection algorithm 2160 may be extracted sequentially starting with a leading virtual page in units of virtual volumes. Alternatively, virtual pages of which the compression algorithm names are registered in the change selection algorithm 2160 may be managed using another table, and the virtual page may be extracted by referring to this table. A method of extracting the virtual page is not limited thereto.

Subsequently, the pool management program 3200 determines whether the present compression algorithm (an algorithm stored in the selection algorithm 2150 corresponding to the virtual page) corresponding to the virtual page extracted in S520 is algorithm 1 and the compression algorithm after change (an algorithm stored in the change selection algorithm 2160 corresponding to the virtual page) is algorithm 2 (S530). As a result, when the present compression algorithm corresponding to the virtual page is algorithm 1 and the compression algorithm after change is algorithm 2 (S530: YES), the pool management program 3200 performs a changing process (compression-time-emphasis compression algorithm change process: see FIG. 16) of changing an algorithm for data having a low access frequency to an algorithm for data having a high access frequency (S540).

On the other hand, when the present compression algorithm corresponding to the virtual page extracted in S520 is algorithm 1 and the compression algorithm after change is not algorithm 2 (S530: NO), the pool management program 3200 determines whether the present compression algorithm corresponding to the virtual page is algorithm 2 and the compression algorithm after change is algorithm 1 (S560).

As a result, when the present compression algorithm corresponding to the virtual page is algorithm 2 and the compression algorithm after change is algorithm 1 (S560: YES), the pool management program 3200 performs a changing process (compression-ratio-emphasis compression algorithm change process: see FIG. 17) of changing an algorithm for data having a high access frequency to an algorithm for data having a low access frequency (S570). When the present compression algorithm corresponding to the virtual page is algorithm 2 and the compression algorithm after change is not algorithm 1 (S560: NO), although it would not occur, if it occurs, since the algorithm is not changed, the pool management program 3200 initializes the change selection algorithm 2160 and the process ends.

After the compression algorithm corresponding to the virtual page is changed in S540 and S570, the pool management program 3200 stores an algorithm registered in the change selection algorithm 2160 corresponding to the virtual page in the selection algorithm 2150 and initializes the change selection algorithm 2160 (S550), and the process ends.

According to the compression algorithm chancre main process, the process is performed asynchronously with an I/O process. When the number of I/Os of a normal operation performed is small, since the compression algorithm corresponding to the virtual page is changed, it is possible to prevent a decrease in the I/O performance of the normal operation due to an overhead of this process.

The process of S570 of the compression algorithm change main process may be executed when the operation rate of the processor 105 is low (equal to or lower than a predetermined threshold), and the process of S540 may be executed immediately. This is because a short compression/decompression process time is preferable when a low access frequency is changed to a high access frequency.

For example, the process of S540 may be performed as an extension of a data read request process or a data write request process. When the process of S540 is performed as an extension of a data overwrite request process, the write process of FIG. 12 may be applied as it is. Moreover, when the process of S540 is performed as an extension of a read request process, the write process of FIG. 12 may be performed after the read process of FIG. 13 is performed.

The process of S540 or S570 of the compression algorithm change process may be performed following a process of migrating data. When the storage device 104 has an automated layer control function, when the access frequency of data having a low access frequency increases, a data migration process of migrating this data to a storage area of a layer for data having a high access frequency is performed. In this data migration process, migration target data is read and is written to a new storage area. In this data migration process, the process of S540 may be performed. Similarly, when an access frequency of data having a high access frequency decreases, the process of S570 may be performed in a data migration process of migrating this data to a storage area of a layer for data having a low access frequency.

Figure 16:
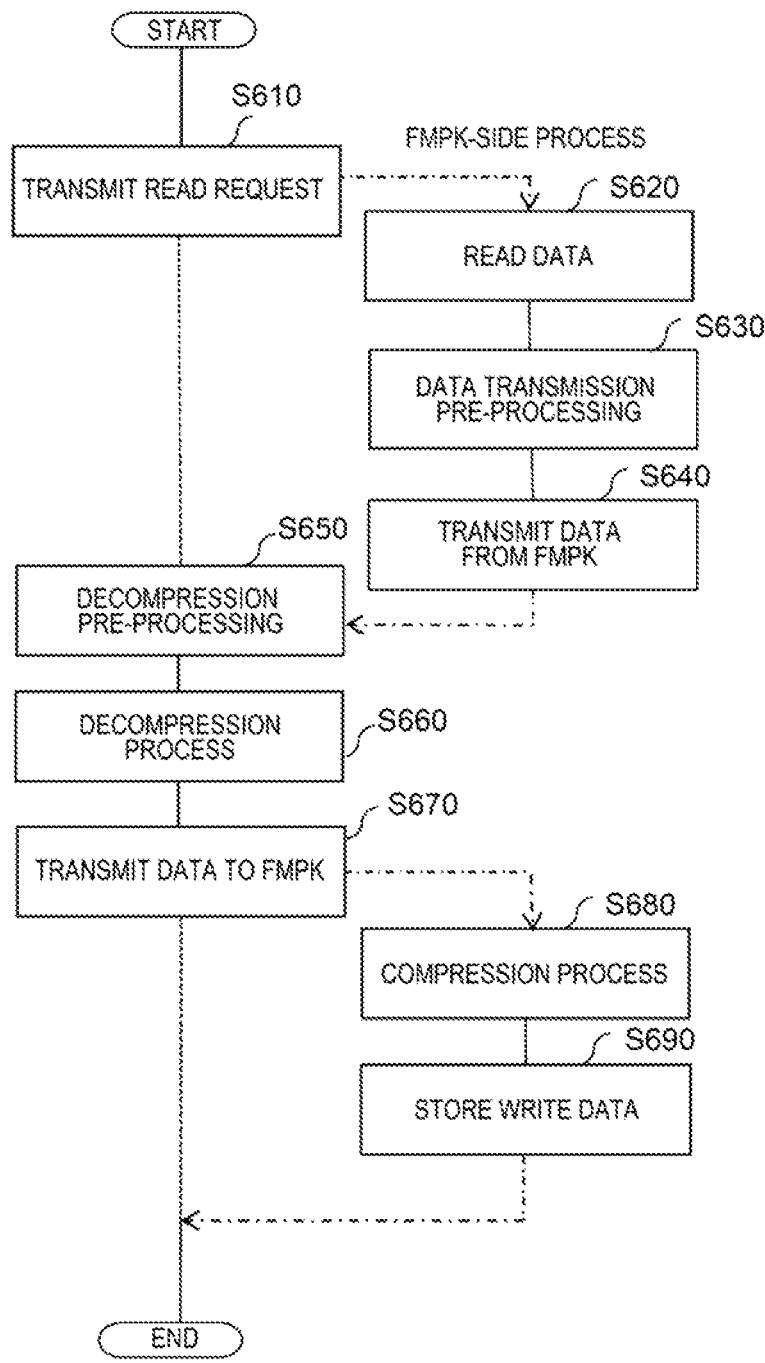
FIG. 16 is a flowchart of a compression-time-emphasis compression algorithm change process according to the first embodiment.

FIG. 16 is a flowchart of a compression-time-emphasis compression algorithm change process according to the first embodiment.

The compression-time-emphasis compression algorithm change process corresponds to the process of step S540 of FIG. 15.

Since a compression algorithm applied is set in units of virtual pages, the compression-time-emphasis compression algorithm change process performs the following process for all blocks that form an actual page allocated to a virtual page.

The I/O processing program 3100 of the storage device 104 transmits a read request for a block of a processing target virtual page to the FMPK 113. Since the data of this block is compressed by the storage controller 109, the I/O processing program 3100 informs the FMPK 113 of the fact that a compression process is to be performed by the storage controller 109 (S610).

Upon receiving the read request transmitted in S610, the FMPK 113 retrieves a storage location of reading target data and stages read request data from the FM chip 280 to the cache memory of the FMPK 113 (S620).

The compression correction processing program 3700 corrects the reading target data by embedding adjustment data (for example, 0 (zero) data) in an area smaller than the block size in order to fit the size of the reading target data to the block size used for data transmission with the storage controller 109 (S630).

Subsequently, the FMPK 113 transmits the corrected reading target data and the compressed data size (that is, the size of a portion which is not adjusted by the adjustment data) to the storage controller 109 (S640).

When the storage controller 109 receives the reading target data transmitted in S640, the compression correction processing program 3400 performs decompression pre-processing of removing the adjustment data corrected on the FMPK 113 side (S650), performs a decompression process (a decompression process corresponding to algorithm 1) on the reading target data from which the adjustment data is removed by the pool management program 3200 (S660), and transmits the decompressed reading target data to the FMPK 113 (S670). In this case, the I/O processing program 3100 may issue a compression instruction to the FMPK 113.

When the FMPK 113 receives the write request and the compression instruction transmitted in S670, the FMPK 113 recognizes that the FMPK 113 itself has to perform a compression process on write data and performs a compression process on the write data according to a predetermined compression algorithm (S680). Subsequently, the processor 213 of the FMPK 113 writes the compressed data in a target storage area of the FM chip 280 corresponding to the write request (S690) and reports completion of the write process to the storage controller 109. The timing of reporting completion of the write process may be the timing at which reception of the write data from the storage controller 109 transmitted in S670 and temporary storage in a buffer (not illustrated) is completed. The storage controller 109 having received the completion report of the write process ends the compression-time-emphasis compression algorithm change process.

According to the compression-time-emphasis compression algorithm change process, the data stored in the FM chip 280 can be changed to compressed data compressed according to a compression algorithm having a short compression time (basically, a short decompression time) and be stored in the FM chip 280. In this way, it is possible to reduce the load of a compression process (and a decompression process) of the storage device 104.

Figure 17:
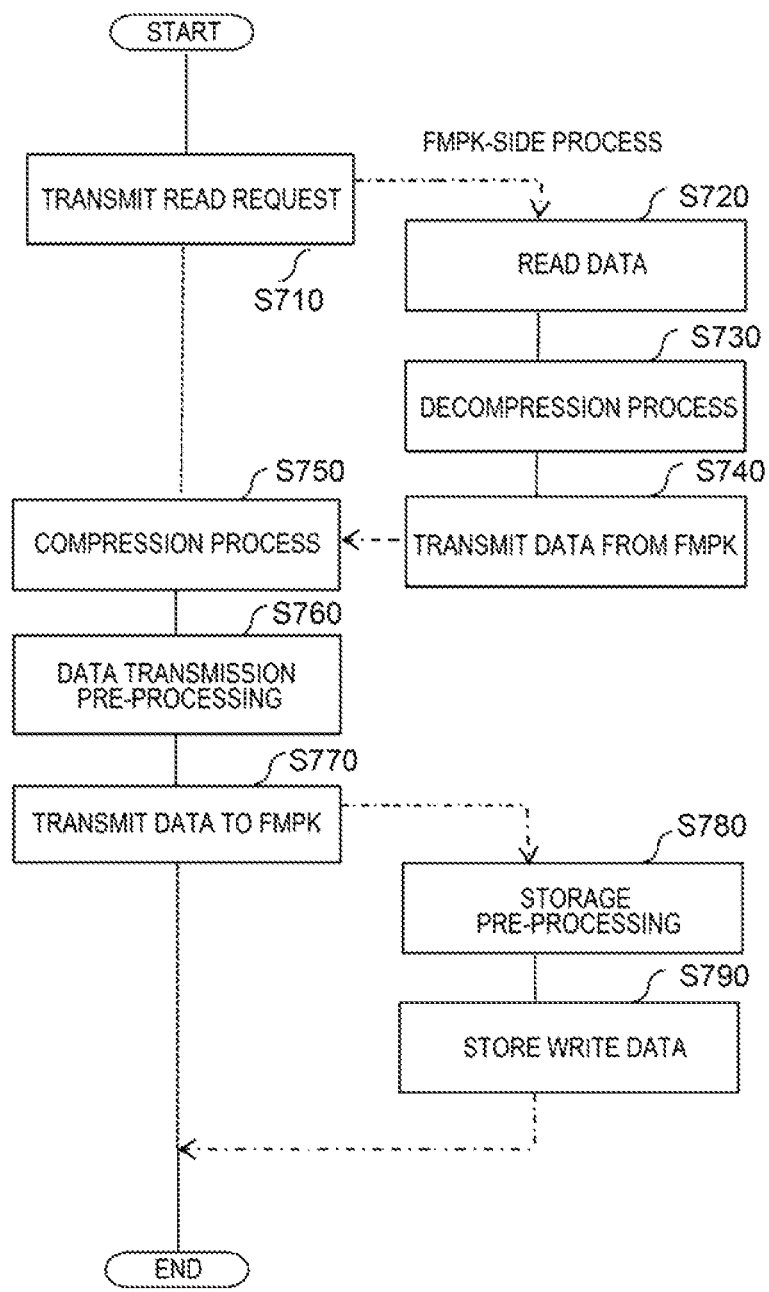
FIG. 17 is a flowchart of a compression-ratio-emphasis compression algorithm change process according to the first embodiment.

FIG. 17 is a flowchart of a compression-ratio-emphasis compression algorithm change process according to the first embodiment.

The compression-ratio-emphasis compression algorithm change process corresponds to the process of step S570 of FIG. 15.

Since a compression algorithm applied is set in units of virtual pages, the compression-time-emphasis compression algorithm change process performs the following process for all blocks that form an actual page allocated to a virtual Page.

I/O processing program 3100 of the storage device 104 transmits a read request for a block of a processing target virtual page to the FMPK 113. Since the data of this block is compressed by the FMPK 113, the I/O processing program 3100 informs the FMPK 113 of the fact that a compression process is to be performed by the FMPK 113 (S710).

Upon receiving the read request transmitted in S230, the FMPK 113 recognizes that the read request is a read process that involves a decompression process, retrieves a storage location of the reading target data, reads the reading target data from the FM chip 280, and stages the read reading target data in a cache memory (not illustrated) of the FMPK 113 (S720). Subsequently, the compression/decompression circuit 216 performs a decompression process on the reading target data stages in the cache memory (S730). Subsequently, the FMPK 113 transmits the decompressed reading target data to the storage controller 109 (S740).

In the storage controller 109 having received the reading target data, the pool management program 3200 performs a compression process on the reading target data according to a predetermined compression algorithm (S750).

Subsequently, the compression correction processing program 3400 performs pre-processing before transmitting the reading target data to the FMPK 113 as write data (S760). When the data size of the compressed data (compressed reading target data) is smaller than the size of a block, the compression correction processing program 3400 embeds predetermined data (for example, all-zero ('0') data: adjustment data) in a portion in which compressed data is not stored to form data having the block size.

After that, the I/O processing program 3100 transmits data of a block containing the compressed data and information (compression size information) of the size (the size after compression of the write data) of the compressed data to the FMPK 113 together with the write request (S770).

When the FMPK 113 receives the write request and the like transmitted in S770, the FMPK 113 registers the received size after compression in the size after compression 2750 corresponding to the block number of the target FMPK address space of the write request, and the compression correction processing program 3700 performs pre-processing for storing the write data in the FM chip 280 which is an actual area (S780). Specifically, the FMPK 113 recognizes that data compressed and corrected by storage device 104 is transmitted upon receiving the size-after-compression information, for example. By referring to the size-after-compression information, the compression correction processing program 3700 determines a range of valid data corresponding to the compressed data of the write data within the transmitted block-based data and a range of adjustment data embedded after the valid data. The compression correction processing program 3700 removes the adjustment data from the received block-based data and extracts valid data (compressed data).

Subsequently, the processor 224 of the FMPK 113 writes the compressed data extracted in S780 to the target storage area of the FM chip 280 (S790) and reports completion of the write process to the storage controller 109. The timing of reporting completion of the write process may be the timing at which reception of the write data from the storage controller 109 transmitted in S770 and temporary storage in a buffer (not illustrated) is completed. The storage controller 109 having received the completion report of the write process ends the compression-ratio-emphasis compression algorithm change process.

According to the compression-ratio-emphasis compression algorithm change process, the data stored in the FM chip 280 can be changed to compressed data compressed according to a compression algorithm having a high compression ratio and be stored in the FM chip 280. In this way, it is possible to improve volume efficiency of the storage device 104.

Next, a storage device according to a second embodiment will be described. In the description of the storage device according to the second embodiment, the constituent elements corresponding to those of the storage device according to the first embodiment will be denoted by the same reference numerals for the sake of convenience.

In the storage device 104 according to the second embodiment, the FMPK 113 has a plurality of compression functions of different compression algorithms, and the plurality of compression functions of the FMPK 113 are used for data compression.

In the present embodiment, the storage controller 109 determines an access frequency for a page including a target block of a read/write process and gives an instruction on information indicating a compression algorithm corresponding to the access frequency to the FMPK 113. The FMPK 113 selects a compression algorithm of data to be stored based on the instruction from the storage controller 109, performs a compression process of compressing the data using the selected compression algorithm, and stores the compressed data in the FM chip 280.

Figure 18:
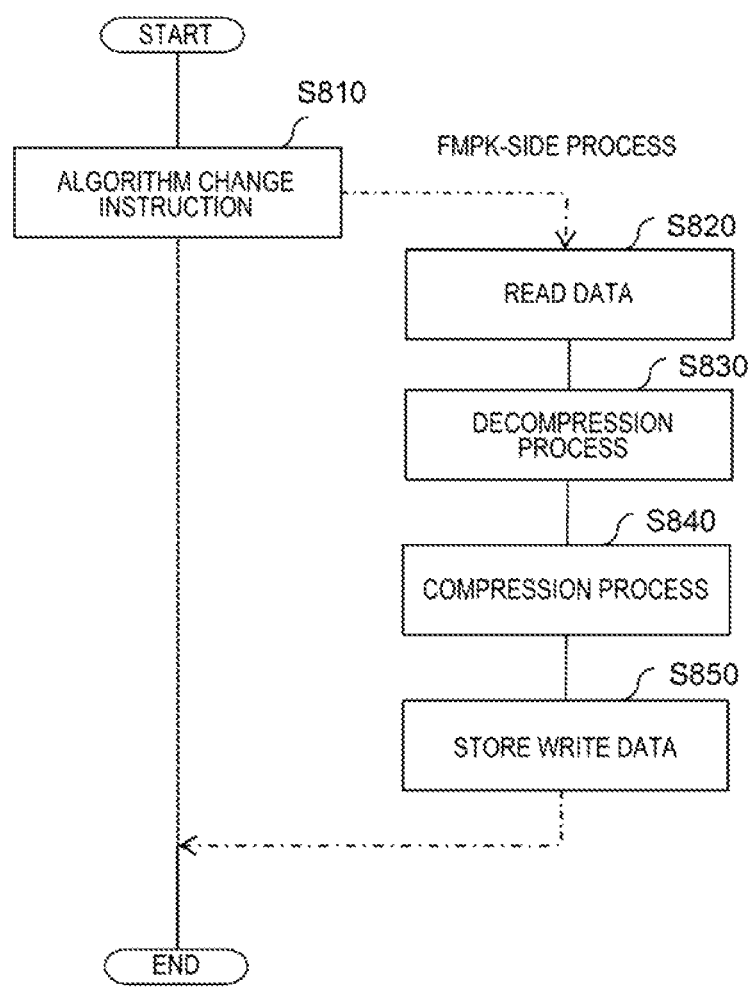
FIG. 18 is a flowchart of a compression algorithm change process of a storage device according to a second embodiment.

FIG. 18 is a flowchart of a compression algorithm change process of the storage device according to the second embodiment.

The compression algorithm change process is a process of changing a compression algorithm for data within the FMPK 113.

The storage controller 109 monitors an access frequency for each page, determines a compression algorithm applied to each page, and issues a compression algorithm change instruction to the FMPK 113 when it is determined that a compression algorithm applied to the page is to be changed (S810). The compression algorithm change instruction includes information indicating an algorithm after change, for example.

Upon receiving the compression algorithm change instruction, the FMPK 113 retrieves a storage location of data (target data) of a processing target page, reads the target data from the FM chip 280, and stages the target data in a cache memory in the FMPK 113 (S820).

The FMPK 113 decompresses the target data staged in the cache memory by a decompression process corresponding to the compression algorithm before change (S830). A functional unit executing the decompression process may be the processor 213 of the FMPK 113 and may be the compression/decompression circuit 116.

Subsequently, the FMPK 113 compresses the decompressed data by a compression process corresponding to a compression algorithm after change (S840). A functional unit executing the compression process may be the processor 213 of the FMPK 113 and may be the compression/decompression circuit 116.

Subsequently, the processor 213 of the FMPK 113 writes the compressed data to the FM chip 280 (S850) and reports completion of the process to the storage controller 109. The storage controller 109 having received the report of completion of the process ends the compression algorithm change process.

According to the storage device 104 of the second embodiment, since the load of the compression/decompression process is not applied to the storage controller 109, the performance of the storage controller 109 can be distributed to other processes.

In the present embodiment, the storage controller 109 determines whether a compression algorithm will be changed based on the access frequency and notifies the FMPK 113 of the change in the compression algorithm. However, the present invention is not limited thereto, and for example, the storage controller 109 may notify the FMPK 113 of the information of the access frequency and the FMPK 113 may determine whether the compression algorithm will be changed.

The storage controller 109 may determine a data compression algorithm for each I/O or a storage area.

The present invention is not limited to the above-described embodiment but can be modified appropriately without departing from the spirit of the present invention.

For example, in the above-described embodiment, the storage controller 109 may have a compression function based on a plurality of compression algorithms, and the storage controller 109 may perform the compression function based on the plurality of compression algorithms.

The storage controller 109 may have a compression function based on the compression algorithm and the FMPK 113 may have a compression function based on a plurality of compression algorithms and perform the plurality of compression functions.

In the first embodiment, the storage controller 109 executes a compression function based on the compression algorithm for data having a low access frequency, and the FMPK 113 executes a compression function based on the compression algorithm having a high access frequency to thereby reduce the load on the storage controller 109 side mainly. However, the present invention is not limited thereto, the use of a plurality of compression algorithms and an execution entity executing the compression algorithm may be determined so as to eliminate a bottleneck portion depending on the performance of the storage controller 109 of the storage device 104, the performance of the FMPK 113, and the type of data handled by the storage device 104.

What is claimed is:

1. A storage device which includes one or more nonvolatile memory packages including a nonvolatile recording medium capable of storing data, and a storage controller that controls storing of write data of a predetermined write request for the nonvolatile memory packages, the storage device configured to:
   compress data, via a processor included in the storage controller, according to a first compression algorithm, wherein the first compression algorithm is a high compression algorithm;
   compress data, via a flash memory package external to the storage controller, according to a second compression algorithm different from the first compression algorithm, wherein the second compression algorithm is a low compression algorithm, a plurality of flash memories included in the flash memory package, wherein a processing capacity of the storage controller is higher than a processing capacity of the flash memories, wherein the storage controller in configured to:
calculate an access frequency for a page of a plurality of pages stored in a virtual volume,
determine if the calculated access frequency is equal to or higher than a predetermined value,
select the second algorithm when the calculated access frequency is equal to or higher than a predetermined value, as a selected algorithm,
compare the second algorithm to a selection algorithm stored in the nonvolatile recording medium,
determine that the selection algorithm stored is not the second algorithm and register that information as a change selection algorithm,
determine that an operation rate of the processor is lower than a predetermined setting value,
change the selection algorithm stored in the nonvolatile recording medium to the selected algorithm,
compress, by the flash memory package, the write data based on the selected algorithm, and
store, by the flash memory package, the compressed write data in the nonvolatile memory package.

2. The storage device according to claim 1, wherein
the virtual volume, to which a storage area of a pool formed by a storage area of the nonvolatile recording medium of the nonvolatile memory package is allocated, is formed in the storage device,
the storage controller, when an overwrite request which is a write request of overwriting a predetermined page of the virtual volume is issued from a host device, sends a write request to the nonvolatile memory package so that write data of the overwrite request is stored in an area of the pool allocated to the predetermined page of the virtual volume, and
a controller of the nonvolatile memory package, upon receiving the write request, changes the storage area allocated to the area of the pool to another storage area and stores the write data in the other storage area.

3. The storage device according to claim 2, wherein
The storage controller transmits and receives data to and from the host device in units of pages of the virtual volume, and transmits and receives data to and from the nonvolatile memory package in units of blocks having a size smaller than the page, and
when a size of compressed data obtained by compressing the target data of the write request using at least one of the processor and the flash memory package included in the storage controller is smaller than a size of the block, the storage controller appends predetermined adjustment data to the compressed data to adjust the size of the compressed data to the size of the block and transmits the adjusted compressed data to the nonvolatile memory package.

4. The storage device according to claim 3, wherein
when the adjustment data is included in the block received from the storage controller, the nonvolatile memory package removes the adjustment data from the block to extract the compressed data and stores the compressed data.

5. The storage device according to claim 3, wherein
when a read request for the virtual volume is received from the host device and target data of the read request is the compressed data having a size smaller than the size of the block, the storage controller acquires block data including the compressed data from the nonvolatile memory package, removes the adjustment data from the block to extract the compressed data, decompresses the compressed data, and transmits the decompressed data to the host device.

6. The storage device according to claim 2, wherein
The storage controller determines whether the write data will be compressed by the processor or the flash memory package based on the access frequency of the page of the virtual volume serving as a write destination of the write request.

7. The storage device according to claim 6, wherein
the first compression algorithm is an algorithm of which the time associated with a compression process is longer than that of the second compression algorithm and the compression ratio is higher than that of the first compression algorithm.

8. The storage device according to claim 6, wherein
the storage controller determines if the selected algorithm is an appropriate algorithm which is an algorithm appropriate for compressing the data stored in one of the plurality of pages of the virtual volume based on the access frequency, determines whether an algorithm used for compressing the data is the appropriate algorithm, decompresses the data when the algorithm used for compressing the data is not the appropriate algorithm, compresses the decompressed data using the appropriate algorithm, and stores the data in the nonvolatile memory package.

9. The storage device according to claim 8, wherein
when the operation rate of the storage device is equal to or smaller than the predetermined setting value and the algorithm used for compressing the data is not the appropriate algorithm, the storage controller decompresses the data, compresses the decompressed data using the appropriate algorithm, and stores the data in the nonvolatile memory package.

10. The storage device according to claim 1, wherein
the processor is provided in the storage controller, and
the flash memory package is included in the nonvolatile memory package.

11. The storage device according to claim 1, wherein
the processor and the flash memory package are included in the nonvolatile memory package.

12. A data management method by a storage device including one or more nonvolatile memory packages including a nonvolatile recording medium capable of storing data and a storage controller that control storing of data with respect to the nonvolatile memory packages, the storage device configured to:
compress data, via a processor included in the storage controller, according to a first compression algorithm, wherein the first compression algorithm is a high compression algorithm;
compress data, via a flash memory package external to the storage controller, according to a second compression algorithm different from the first compression algorithm, wherein the second compression algorithm is a low compression algorithm, a plurality of flash memories included in the flash memory package, wherein a processing capacity of the storage controller is higher than a processing capacity of the flash memories;
calculate an access frequency for a page of a plurality of pages stored in a virtual volume;
determine if the calculated access frequency is equal to or higher than a predetermined value;
select the second algorithm when the calculated access frequency is equal to or higher than a predetermined value, as a selected algorithm;

compare the second algorithm to a selection algorithm stored in the nonvolatile recording medium;

determine that the selection algorithm stored is not the second algorithm and register that information as a change selection algorithm;

determine that an operation rate of the processor is lower than a predetermined setting value, change the selection algorithm stored in the nonvolatile recording medium to the selected algorithm;

compress, by the flash memory package, the write data based on the selected algorithm; and store, by the flash memory package, the compressed write data in the nonvolatile memory package.

13. A non-transitory computer readable medium storing a data management program for controlling a computer that forms a storage controller that controls storing of data with respect to one or more nonvolatile memory packages including a nonvolatile recording medium capable of storing data, when executed by a processor, causes the processor to:

compress data, via a processor included in the storage controller, according to a first compression algorithm, wherein the first compression algorithm is a high compression algorithm;

compress data, via a flash memory package external to the storage controller, according to a second compression algorithm different from the first compression algorithm, wherein the second compression algorithm is a low compression algorithm, a plurality of flash memories included in the flash memory package, wherein a processing capacity of the storage controller is higher than a processing capacity of the flash memories;

calculate an access frequency for a page of a plurality of pages stored in a virtual volume;

determine if the calculated access frequency is equal to or higher than a predetermined value;

select the second algorithm when the calculated access frequency is equal to or higher than a predetermined value, as a selected algorithm;

compare the second algorithm to a selection algorithm stored in the nonvolatile recording medium;

determine that the selection algorithm stored is not the second algorithm and register that information as a change selection algorithm;

determine that an operation rate of the processor is lower than a predetermined setting value;

change the selection algorithm stored in the nonvolatile recording medium to the selected algorithm;

compress, by the flash memory package, the write data based on the selected algorithm; and store, by the flash memory package, the compressed write data in the nonvolatile memory package.

\* \* \* \* \*